(12) United States Patent
Takahashi

(10) Patent No.: US 6,931,531 B1
(45) Date of Patent: Aug. 16, 2005

(54) IMAGE OBJECT RECORDING, COMPRESSION, AND ENCRYPTION METHOD AND SYSTEM

(75) Inventor: Toshiya Takahashi, Ibaraki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/387,555

(22) Filed: Sep. 1, 1999

(30) Foreign Application Priority Data

Sep. 2, 1998 (JP) ................................. 10-248708

(51) Int. Cl.⁷ .............................................. H04L 9/00
(52) U.S. Cl. ...................... 713/167; 382/100; 382/232
(58) Field of Search ................................ 713/201, 200, 713/202, 167; 380/217, 206; 725/31; 700/90; 382/100, 232

(56) References Cited

U.S. PATENT DOCUMENTS

| | | | | |
|---|---|---|---|---|
| 4,281,216 A | * | 7/1981 | Hogg et al. .................. | 380/277 |
| 4,529,840 A | * | 7/1985 | Colton et al. ............. | 348/14.09 |
| 5,638,445 A | * | 6/1997 | Spelman et al. ............... | 705/77 |
| 5,712,915 A | * | 1/1998 | Onufry, Jr. .................... | 380/270 |
| 5,915,027 A | * | 6/1999 | Cox et al. ...................... | 380/54 |
| 6,108,423 A | * | 8/2000 | Sako et al. .................. | 380/203 |
| 6,172,988 B1 | * | 1/2001 | Tiernan et al. ............... | 370/473 |
| RE37,052 E | * | 2/2001 | Park .......................... | 380/203 |
| 6,269,275 B1 | * | 7/2001 | Slade .......................... | 700/90 |
| 6,526,171 B1 | * | 2/2003 | Furukawa .................... | 382/232 |

OTHER PUBLICATIONS

Schneier, Applied Cryptography, 1996, John Wiley & Sons, Inc., 2nd Editon, 357-358.*
Wu, MPEG-4 Compressed video over the internet, Jun. 1999, IEEE, 327-331.*
Bober, Video coding for mobile communications-MPEG4 perspective, 1996, IEEE, 1-3.*
"Satellite Digital Broadcasting System Technology", Matsushita Technical Journal vol. 44, No. 1, Feb. 1998.

* cited by examiner

Primary Examiner—Kim Vu
Assistant Examiner—Paula Klimach
(74) Attorney, Agent, or Firm—Wenderoth, Lind & Ponack, L.L.P.

(57) ABSTRACT

Selective encryption for object data such that objects having copyrights to-be-protected are encrypted. There are provided a plurality of data compression devices for compressing respective object data respectively corresponding to a plurality of objects which compose a scene, a multiplexor for multiplexing scene description data and compressed object data to produce a multiplexed bit stream MB, a scrambler for encrypting (scrambling) individual streams corresponding to the objects having copyrights to-be-protected in the multiplexed bit stream MB, to produce an encrypted bit stream SB, for outputting the encrypted bit stream SB to a data storage medium or a data transmission medium.

23 Claims, 14 Drawing Sheets

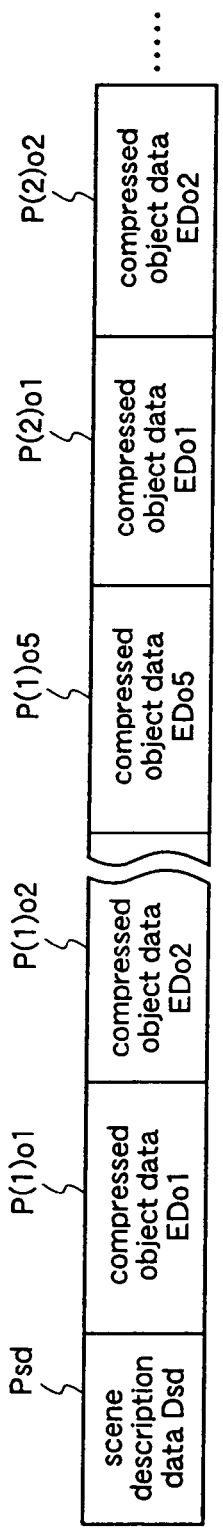
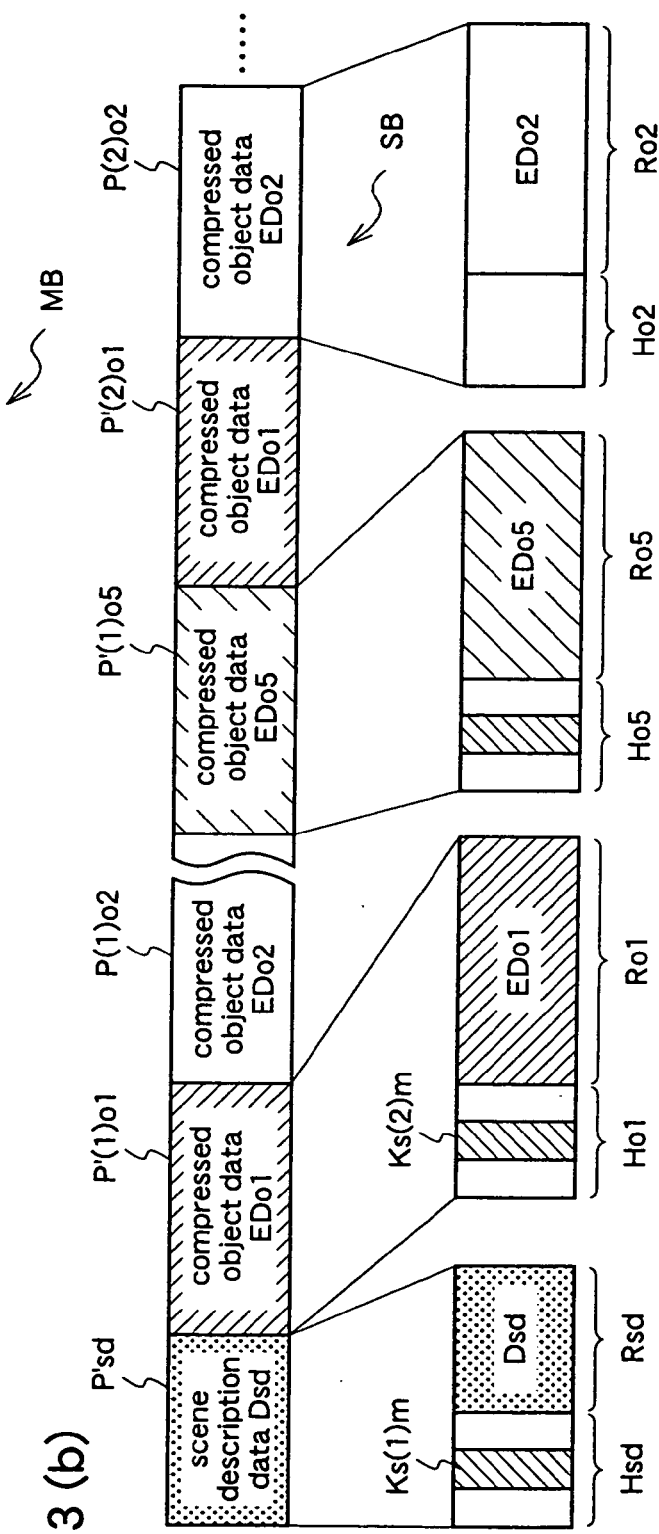
Fig.3 (a)
Fig.3 (b)

Fig.4 (a)

```
SD  scene descriptor :
       2D object {                           OD1
    A1   video object {object descriptor (1)}  OD2
    21   audio object {object descriptor (2)}
    22   2D object {                            OD3
    A2   text object {"Let's Start"}
    26   video object {object descriptor (3)}  OD4
    23   2D object {                            OD5
    A3   video object {object descriptor (4)}
    24   video object {object descriptor (5)}
    25  }
```

Fig.4 (b)

```
      OD1
object descriptor (1) :
    object number : 1
    stream type : MPEG4 video
    access right information : copying "unauthorized"
object descriptor (3) :  OD3
    object number : 3
    stream type : MPEG4 video
    access right information : copying "unauthorized"
object descriptor (5) :  OD5
    object number : 5
    stream type : MPEG4 video
    access right information : copying "unauthorized"
```

Fig.4 (c)

```
      OD2
object descriptor (2) :
    object number : 2
    stream type : MPEG4 audio
    access right information : copying "authorized"
object descriptor (4) :  OD4
    object number : 4
    stream type : MPEG4 audio
    access right information : copying "unauthorized"
```

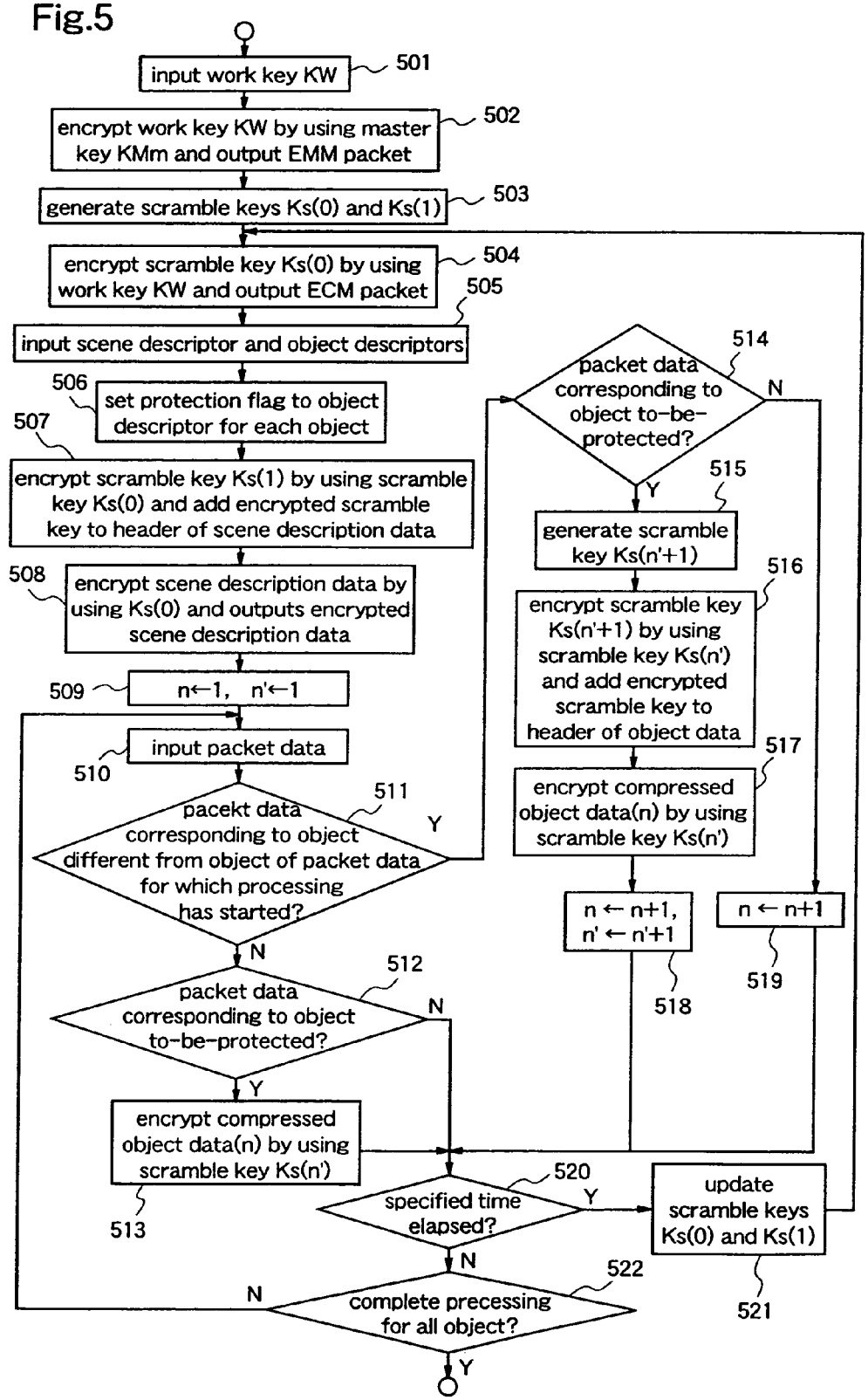

IMAGE OBJECT RECORDING, COMPRESSION, AND ENCRYPTION METHOD AND SYSTEM

FIELD OF THE INVENTION

The present invention relates to a data processing method and a data processing apparatus. More particularly, the present invention relates to a process for transmitting/receiving data which is capable of limiting unauthorized (illegal) copying of information represented as digital image data, digital audio data, and the other digital data, for protecting the information according to a copyright, and realizes the use of the information under control of accounting.

The present invention also relates to a data storage medium which contains a program for implementing the process for transmitting/receiving data by software, and digital data for which processing for limiting the unauthorized copying has been performed.

BACKGROUND OF THE INVENTION

In recent years, as digitization of image data evolves, there is a need for protection of a copyright of an image represented as digital data, since an image quality of the digital data is not degraded if duplicated. In addition, protection of the copyright of the image is closely related to control of accounting on the usage of the image data, and a conditional access method which is put into practical use in digital satellite broadcast is considered as a measure taken to protect the copyright of the image data.

As an example of a conventional method for protecting the copyright, the above-described restricted receiving method for digital satellite broadcast ("Satellite Digital Broadcast System Technology" written by Asada, Inoue, et. al, Matushita Technical Journal Vol. 44, No. 1, February 1998), will now be described with reference to figures. In this digital satellite broadcast, a compression scheme and a multiplexing scheme according to MPEG (Moving Picture Experts Group) standard are employed.

FIG. 9 is a diagram for explaining a conventional restricted receiving system and showing a data transmission/receiving system which adopts the restricted receiving method.

Turning to FIG. 9, there is shown a data transmission/receiving system 1000, which comprises a data transmission-side apparatus 81 for compressing, multiplexing, and scrambling video data Dvi and audio data Dau according to MPEG2 standard and outputting the resulting data, and a data receiving-side apparatus 91 which receives and reproduces scrambled data (transmitted data) Sg from the data transmission-side apparatus 81.

The data transmission-side apparatus 81 includes an audio encoder 82 for compressing the audio data Dau according to MPEG2 standard and outputting compressed (encoded) audio data EDau, a video encoder 83 for compressing the video data Dvi according to MPEG2 standard and outputting compressed (encoded) video data EDvi, and multiplexing means 84 for packetizing the compressed audio data EDau and compressed video data EDvi to generate a plurality of data packets such that each of them has a fixed-bit length, multiplexing the plurality of data packets, and outputting a multiplexed bit stream MB. This packetization is performed for each program such that one packet contains data of the same program, and program identification information used for identifying each program is added to a corresponding packet header.

The data transmission-side apparatus 81 further includes a scrambler 85 for scrambling a predetermined portion of each data packet included in the multiplexed bit stream MB by using a scramble key Ks(t) and outputting a scrambled (encrypted) bit stream SB, a scramble key encryption unit 86 for encrypting the scramble key Ks(t) by using a work key KW to generate an encrypted scramble key Ks(t)m, storing the encrypted scramble key Ks(t)m in an ECM (Entitlement control message) packet, and outputting the ECM packet, and a work key encryption unit 87 for encrypting the work key KW by using a master key KMm to generate an encrypted work key KWm, storing the encrypted work key KWm in an EMM (Entitlement management message) packet, and outputting the EMM packet.

The data transmission-side apparatus 81 still further includes a packet multiplexing unit 80 for multiplexing the scrambled bit stream SB (data packets), ECM packets, and EMM packets, to produce multiplexed data to-be-transmitted Sg.

Furthermore, the data transmission-side apparatus 81 includes a scramble key generation unit for generating the scramble key Ks(t) updated at regular time intervals, a work key generation unit for generating the work key KW, and a master key storage unit for storing the master key KMm to be supplied to the work key encryption unit 87, although these components are not shown in this figure.

The data receiving-side apparatus 91 includes a packet separation unit 90 which receives the multiplexed data Sg which has been transmitted, separates the multiplexed data Sg into the scrambled bit stream SB (data packet), the ECM packets, and the EMM packets.

The data receiving-side apparatus 91 further includes a work key decryption unit 97 for decrypting the encrypted work key KWm stored in the EMM packet by using the master key KMm to generate the work key KM, a scramble key decryption unit 96 for decrypting the encrypted scramble key Ks(t)m stored in the ECM packet by using the work key KW to generate the scramble key Ks(t)m, and a descrambler 92 for descrambling a scrambled portion of the data packet included in the scrambled bit stream SB by using the scramble key Ks(t) to produce a descrambled bit stream DB.

The data receiving-side apparatus 91 still further includes separation means 93 for separating and extracting the compressed audio data EDau and the compressed video data EDvi from the descrambled bit stream DB, an audio decoder for decompressing the compressed audio data EDau to provide reproduced audio data RDau, and a video decoder 95 for decompressing the compressed video data EDvi to provide reproduced video data RDvi.

Furthermore, the data receiving-side apparatus 91 includes a master key storage unit for storing the master key KMm to be supplied to the work key decryption unit 97, although this is not shown.

FIG. 10(*a*) shows a structure of the multiplexed data Sg, FIG. 10(*b*) shows a structure of a data packet included in the scrambled bit stream SB, FIG. 10(*c*) shows a structure of the ECM packet, and FIG. 10(*d*) shows a structure of the EMM packet.

Turning to FIG. 10(*a*), the multiplexed data Sg includes data packets 100*a*(*i*) [i=1, 2, 3, . . . , 6, 7, 8, . . . ], ECM packets 110*a*(*t*) [t=1, 2, . . . ], and an EMM packet 120*a*.

The data packets 100*a*(1), 100*a*(2), 100*a*(3), . . . , 100*a*(6), 100*a*(7), and 100*a*(8) are 1st to 8th data packets included in the scrambled bit stream SB. The multiplexed bit stream MB includes data packets including compressed video data and compressed audio data corresponding to various types of program data. Therefore, the multiplexed data Sg shown in FIG. 10(a) includes the data packets included in the scrambled bit stream, the ECM packets, and the EMM packets for various program data.

A description will be made to explain structures of the respective packets in brief.

Turning to FIG. 10(b), the data packet 100a(i) is composed of a header 100 at the head thereof, an adaptation field 101 which follows the header 100 and represents attribute information and the like of corresponding data, and a data part called "Pay Load" 102 which follows the adaptation field 101.

The compressed audio data Dau or the compressed video data EDvi is stored in the Pay Load 102 of each data packet 100a(i), which corresponds to a scrambled region in each data packet 100a(i).

The ECM packet 110a(t), which is shown in FIG. 10(c), is composed of a header 110 and a key storage unit 111 which contains the encrypted scramble key Ks(t)m. The EMM packet 120a, which is shown in FIG. 10(d), is composed of a header 120 and a key storage unit 121 which contains the encrypted work key KWm. The scramble key Ks(t) is updated with elapse of time (t). Encrypted scramble keys Ks(1)m and Ks(2)m are obtained by encrypting a scramble key Ks(1) and a scramble key Ks(2) updated at time t=t1 and t=t2, respectively, by using the work key KW.

By the way, in the above data transmission/receiving system 1000, accounting on each program data is controlled. Specifically, for a charged program which requires a contract, corresponding program data is scrambled so that only a specified (intended) viewer which made the contract utilizes this program. Thereby, copyright of specified program data is protected. Therefore, it is difficult for viewers that have not made the contract to normally reproduce and watch the content of such charged program.

More specifically, the Pay Load 102 of the data packet corresponding to the charged program which is included in the scrambled bit stream SB, is scrambled, and thereby general (unintended) viewers who have not made the contract, cannot watch the charged program. To the header 100 of each data packet 100a(i), a scramble identifier Fs(i) indicating whether or not corresponding Pay load 102 is scrambled is affixed.

Operation will now be described.

When the video data Dvi and the audio data Dau corresponding to various types of programs are input to the data transmission-side apparatus 81, the video encoder 83 and the audio encoder 82 compress these data according to MPEG2 standard, to produce the compressed video data EDvi and compressed audio data EDau, respectively. The multiplexing means 84 multiplexes these compressed data EDvi and EDau according to MPEG2 standard such that each of them is stored in a corresponding data packet having a fixed-packet length, i.e., a fixed-bit length and the respective data packets 100a(i) are multiplexed to provide the multiplexed bit stream MB.

When the multiplexed bit stream MB is input to the scrambler 85, the scrambler 85 scrambles the Pay Load 102 of the data packet 100a(i) corresponding to program data for which accounting is to be controlled, and outputs accounting-controlled bit stream (scrambled bit stream) SB.

Hereinafter, the above scrambling will be explained in detail.

As described above, the compressed audio data EDau and the compressed video data EDvi corresponding to individual programs are multiplexed on a packet basis and the resulting multiplexed bit stream MB is scrambled (encrypted) by the scrambler 85 by using the scramble keys Ks(t) to create the scrambled bit stream SB, which is output to the packet multiplexing unit 80. For security, the scramble keys Ks(t) are updated by a generator (not shown) at intervals ranging from several to several-ten seconds. The scramble key Ks(t) represents a set of time-series data, i.e., scramble keys Ks(1) and Ks(2) updated at regular time intervals.

The scramble key encryption unit 86 encrypts the scramble key Ks(t) by using the work key KW. The encrypted scramble key Ks(t)m is stored in the ECM packet 110a(t) different from the data packet 100a(i) of the scrambled bit stream SB and output to the packet multiplexing unit 80. The work key encryption unit 87 encrypts the work key KW by using the master key KMm stored in the key storage unit (not shown) of the data processing apparatus 1000. The encrypted work key KWm is stored in the EMM packet 120a different from the data packet 100a(i) and the ECM packet 110a(t), and output to the packet multiplexing unit 80. The master key KMm varies from viewer to viewer, and is distributed to a receiver (data receiving-side apparatus) 91 by using a physical medium such as an IC card, and stored in a key storage unit (not shown) in the receiver 91. Therefore, one work key KW is encrypted by different master keys KMm for plural receivers (viewers).

The packet multiplexing unit 80 multiplexes the data packets 100a(i), the ECM packets 110a(t), the EMM packets 120a, and outputs "multiplexed data to-be-transmitted" (multiplexed data)Sg.

When the data receiving-side apparatus (receiver) 91 receives the multiplexed data Sg including the scrambled program data to be broadcast in real time and the encrypted scramble keys Ks(t)m, the packet separation unit 90 separates data packets 100a(i), ECM packets 110a(t), and an EMM packet 120a for a desired program from the multiplexed data Sg. The work key decryption unit 97 decrypts the encrypted work key KWm stored in the EMM packet 120a by using the master key KMm held by the receiver. The resulting decrypted work key KW is held in the receiver.

Also, the scramble key decryption unit 96 decrypts the encrypted scramble key Ks(t)m by using the work key KW held in the receiver and outputs the decrypted scramble key Ks(t) to the descrambler 92. The descrambler 92 descrambles the Pay Load 102 of the data packet 100a(i) of the scrambled bit stream SB to produce the descrambled bit stream DB. The separation means 93 extracts the compressed audio data Dau and the compressed video data EDvi from the descrambled bit stream DB.

Thereafter, the compressed audio data EDau and the compressed video data EDvi are input to the audio decoder 94 and the video decoder 95, which decompress these data, respectively, and output reproduced audio data RDau and reproduced video data RDvi, respectively.

Using the above conventional data transmission/receiving system, the following problem arises.

In a coding scheme according to MPEG4 which is currently standardized as an international standard for an image compression technique, an image signal corresponding to a scene (image corresponding to a frame) is divided into image signals respectively corresponding to a plurality of objects composing the scene, and the image signals are compressed object by object.

On the other hand, in a coding scheme according to MPEG2 standard (MPEG2), one video object composes one scene. When an audio object is handled as a scene object, it is assumed that two objects (video object and audio object) compose the scene. Considering that the audio accompanies the image and the scene is reproduced by reusing the image corresponding to the scene, the scene according to MPEG2 is taken as being composed of one video object.

In the coding scheme according to MPEG4 (MPEG4), the image signal corresponding to the scene is coded for each of the objects composing the scene, and in a decoding scheme according to MPEG4, coded data of respective objects is decoded for each object. Therefore, it is necessary to manage a copyright for each of the objects composing the scene instead of managing it for the whole scene. This is because some of the objects composing the scene do not require protection of their copyrights, and may be copied. So, MPEG4 requires object-based copyright management.

When the plurality of objects composing the scene includes at least one object requiring protection of its copyright, like data handled in MPEG2, object data corresponding to all the objects composing the scene could be scrambled.

In this case, however, respective object data is descrambled only by one-decryption of the object data corresponding to all the objects. Since the object data corresponding to all the objects is individually separatable, a target object having a copyright to-be-protected can be extracted from the scene after descrambling. It is easy to use the target object which has been extracted as one of a plurality of objects composing another scene.

In the data transmission/receiving system according to MPEG4, if the object having the copyright to-be-protected is used although this is unauthorized (illegal), it is difficult to prove this unauthorized usage. As a consequence, the copyright of the object might be often violated.

Thus, using the method in which all the objects composing the scene including the objects having copyrights to-be-protected are scrambled indiscriminately, in the data transmission/receiving system according to MPEG4, the unauthorized usage of the objects having copyrights to-be-protected is not prevented satisfactorily.

SUMMARY OF THE INVENTION

The present invention is directed to solving the above-described problem, and it is an object of the present invention to provide a data processing method and a data processing apparatus which are capable of scrambling specified objects such as objects having copyrights to-be-protected for each object, among a plurality of objects composing a scene, and is thereby capable of satisfactorily preventing unauthorized usage of the objects having copyrights to-be-protected in a data processing system according to MPEG4.

It is another object of the present invention to provide a data storage medium which contains a program for implementing data processing by software for processing object data corresponding to the plurality of objects composing the scene so that unauthorized usage of the specified objects is prevented and outputting processed data to a transmission medium or a storage medium, and contains the processed data output through the data processing.

It is still another object of the present invention to provide a data processing method and a data processing apparatus which make it difficult to perform unauthorized copying of video data corresponding to the specified objects which require protection of their copyrights among the plurality of objects composing the scene.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a 1st aspect of the present invention, there is provided a data processing method for storing or transmitting a plurality of object data respectively corresponding to a plurality of objects which compose a scene and including object data as video data or audio data, and scene description data which describes how the plurality objects compose the scene, and the method comprises: an encryption step for encrypting at least object data corresponding to specified objects which are predetermined among the plurality of objects; and a data output step for outputting respective object data and the scene description data to a storage medium or a transmission medium. Therefore, the object data is selectively encrypted (scrambled) so that object data corresponding to the specified objects having copyrights to-be-protected is encrypted.

According to a 2nd aspect of the present invention, in the data processing method of the 1st aspect, in the data output step, encryption identifiers each indicating whether or not object data of a corresponding object included in the plurality of objects has been encrypted, are stored in the scene description data and output to the storage medium or the transmission medium. Therefore, at a data reading end or a data receiving end, it is decided whether or not decryption (descrambling) for the respective object data is necessary before it is received, whereby simplified and high-speed reproduction of the object data is achieved.

According to a 3rd aspect of the present invention, in the data processing method of the 1st aspect, in the data output step, control information (encryption key) required for encryption is stored in the scene description data and output to the storage medium or the transmission medium. Therefore, at the data receiving end, it is not necessary to hold the encryption keys. If the encryption process at the recording end or the transmission end is intensive because of many encryption keys, the encryption keys to-be-held at the data reading end or the data receiving end are not increased.

According to a 4th aspect of the present invention, in the data processing method of the 1st aspect, in the encryption step, only object data of the specified objects which is predetermined among the scene description data and the plurality of object data, is encrypted. Therefore, at the data recording end or the data transmission end, only the object data corresponding to the specified objects is encrypted (scrambled), whereby simplified and high-speed encryption is achieved.

According to a 5th aspect of the present invention, in the data processing method of the 1st aspect, wherein in the encryption step, when encrypting the object data of the specified objects, plural different control information (encryption keys) for the respective specified objects is used as control information required for encrypting the respective object data. Therefore, the encrypted object data is difficult to decrypt, and such encryption process provides robust protection of the individual objects to-be-protected.

According to a 6th aspect of the present invention, in the data processing method of the 1st aspect, in the encryption step, a type of control information (encryption key) required for encryption is changed with elapse of time after the encryption of the object data starts. Therefore, the encrypted object data is difficult to decrypt, and such encryption process provides robust protection of the objects to-be-protected.

According to a 7th aspect of the present invention, there is provided a data processing method for storing or transmitting a plurality of object data respectively corresponding to a plurality of objects which compose a scene and including object data as video data or audio data, and scene description data which describes how the plurality objects compose the scene, and the method comprises: a compression step for compressing object data corresponding to each of the plurality of objects which compose the scene and outputting compressed object data; an encryption step for sequentially encrypting at least compressed object data corresponding to specified objects which are predetermined among the plurality of objects, according to control information (encryption key) for encryption of respective object data corresponding to the specified objects; and a data output step for outputting respective compressed object data and the scene description data to the storage medium or the transmission medium, in the encryption step, control information for a target object corresponding to object data to be encrypted is encrypted according to control information for an encrypted object corresponding to previously encrypted object data, and encrypted control information is added to the previously encrypted object data. Therefore, in order to reproduce object data corresponding to an object to-be-protected, object data which has been previously transmitted, becomes necessary. Therefore, the encrypted object data is difficult to decrypt, and such encryption process provides noticeably robust protection of the individual objects to-be-protected.

According to an 8th aspect of the present invention, there is provided a data processing method for storing or transmitting a plurality of object data respectively corresponding to a plurality of objects which compose a scene and including object data as video data or audio data, and scene description data which describes how the plurality objects compose the scene, and the method comprises: a compression step for compressing object data corresponding to each of the plurality of objects which compose the scene, and outputting compressed object data; an encryption step for sequentially encrypting at least compressed object data corresponding to specified objects which are predetermined among the plurality of objects according to first control information for encryption; and a data output step for outputting respective compressed object data and the scene description data to the storage medium or the transmission medium, and the encryption step includes encrypting the first control information according to second control information for encryption, dividing encrypted first control information into a plurality of information parts respectively corresponding to the specified objects, and adding the plurality of information parts to the object data of the specified objects, respectively. Therefore, the scramble key Ksb cannot be reproduced without extracting data packets of all the objects to-be-protected. That is, if object data corresponds to an object to-be-protected from the encrypted bit stream, this object data cannot be reproduced. This provides greatly robust protection against unauthorized copying of individual objects to-be-protected.

According to a 9th aspect of the present invention, there is provided a data processing apparatus for storing or transmitting a plurality of object data respectively corresponding to a plurality of objects which compose a scene and including object data as video data or audio data, and scene description data which describes how the plurality of objects compose the scene, and the apparatus comprises: a plurality of data compression means respectively provided for the plurality of objects, for compressing respective object data and outputting respective compressed object data; multiplexing means for multiplexing the scene description data and the respective compressed object data as individual streams and outputting a multiplexed bit stream; and encryption means for encrypting individual streams in the multiplexed bit stream which correspond to specified objects which are predetermined among the plurality of objects, to produce an encrypted bit stream, and the encrypted bit stream is output to the data storage medium or the data transmission medium. Therefore, the object data is selectively encrypted (scrambled) so that object data corresponding to the specified objects having copyrights to-be-protected is encrypted.

According to a 10th aspect of the present invention, there is provided a data processing method which reads an encrypted bit stream from a storage medium or receives the encrypted bit stream through a transmission medium and performs reproduction of the encrypted bit stream, the encrypted bit stream being obtained by encrypting at least object data corresponding to specified objects which is predetermined among a plurality of object data respectively corresponding to a plurality of objects which compose a scene and including object data as video data or audio data, and scene description data which describes how the plurality of objects compose the scene, and the method comprises: a decision step for deciding whether or not the scene description data and the respective object data have been encrypted; and are production step for decrypting encrypted data of the encrypted bit stream and displaying respective object data, according to a decision result of the decision step. Therefore, at the data reading end or the data transmission end, the encrypted (scrambled) object data or the encrypted scene description data is selectively decrypted (descrambled), whereby the encrypted data is reproduced efficiently.

According to an 11th aspect of the present invention, there is provided a data processing apparatus which reads an encrypted bit stream from a storage medium or receives the encrypted bit stream through a transmission medium and performs reproduction of the encrypted bit stream, the encrypted bit stream being obtained by encrypting at least object data corresponding to specified objects which is predetermined among a plurality of object data respectively corresponding to a plurality of objects which compose a scene and including object data as video data or audio data, and scene description data which describes how the plurality of objects compose the scene, and the apparatus comprises: decryption means for decrypting encrypted scene description data or encrypted object data included in the encrypted bit stream according to a first control signal to produce decrypted data; and display means for displaying the scene based on the decrypted data according to a second control signal; and control means for controlling the decryption means and the display means by using the first and second control signals so that reproduction including decryption of the encrypted data and display of respective object data is performed depending on whether or not the scene description data and the respective object data have been encrypted, when the encrypted bit stream is received. Therefore, at the data reading end or the data transmission end, the encrypted (scrambled) object data or the encrypted scene description data is selectively decrypted (descrambled), whereby the encrypted data is reproduced efficiently.

According to a 12th aspect of the present invention, there is provided a data storage medium which contains a data processing program for making a computer perform data processing for a plurality of object data respectively corresponding to a plurality of objects which compose a scene and including object data as video data or audio data, and scene description data which describes how the plurality of objects compose the scene, and the data processing program comprises: an encryption step for encrypting at least object data corresponding to specified objects which are predetermined among the plurality of objects; and a data output step for outputting respective object data and the scene description data to a storage medium or a transmission medium. Therefore, selective encryption (scrambling) for the specified objects as the objects to-be-protected, is realized by software.

According to a 13th aspect of the present invention, there is provided a data storage medium for storing digital data used for reproducing a scene, and the digital data includes a plurality of object data respectively corresponding to a plurality of objects which compose the scene and including object data as video data or audio data, and scene description data which describes how the plurality of objects compose the scene, and is obtained by encrypting at least object data corresponding to specified objects which is predetermined among the plurality of object data and the scene description data. Therefore, at the data reading end, the encrypted (scrambled) object data or the encrypted scene description data is selectively decrypted (descrambled), whereby the encrypted data is reproduced efficiently.

According to a 14th aspect of the present invention, there is provided a data processing method which reads an encrypted bit stream from a storage medium or receives the encrypted bit stream through a transmission medium and performs reproduction of the encrypted bit stream, the encrypted bit stream being obtained by encrypting at least object data corresponding to specified objects which is predetermined among a plurality of object data respectively corresponding to a plurality of objects which compose a scene and including object data as video data or audio data, and scene description data which describes how the plurality of objects compose the scene, and the method comprises: deciding whether or not encrypted object data corresponding to the specified objects is reproducible; and performing reproduction of all object data including decryption of the encrypted object data corresponding to the specified objects and display of respective object data when deciding that the encrypted object data is reproducible. This provides robust protection of the specified objects and makes it difficult to conduct illegal usage such as unauthorized copying of the objects to-be-protected.

According to a 15th aspect of the present invention, there is provided a data processing method which reads an encrypted bit stream from a storage medium or receives the encrypted bit stream through a transmission medium and performs reproduction of the encrypted bit stream, the encrypted bit stream being obtained by compressing a plurality of object data respectively corresponding to a plurality of objects which compose a scene and including object data as video data or audio data, to produce a plurality of compressed object data, and by encrypting at least compressed object data corresponding to specified objects which is predetermined among the plurality of compressed object data and scene description data which describes how the plurality of objects compose the scene, and the method comprises the steps of: deciding whether or not compressed and encrypted object data corresponding to the specified objects is reproducible; and performing reproduction of all object data including decryption of the compressed and encrypted object data corresponding to the specified objects, and decompression and display of the respective compressed object data when deciding that the compressed and encrypted object data is reproducible. This provides robust protection of the specified objects and makes it difficult to conduct illegal usage such as unauthorized copying of the objects to-be-protected.

According to a 16th aspect of the present invention, in the data processing method of the 15th aspect, when deciding that the compressed and encrypted object data is reproducible, the compressed and encrypted object data corresponding to all the specified objects can be read from the storage medium or can be received through the transmission medium. Therefore, when object data corresponding to the objects to-be-protected are all present in the storage medium or the transmission end, the object data corresponding to the specified objects is reproduced. This effectively prevents illegal usage such as unauthorized copying of the objects to-be-protected.

According to a 17th aspect of the present invention, in the data processing method of the 15th aspect, when deciding that the compressed and encrypted object data is reproducible, the scene description data has been read from the storage medium or received through the transmission medium, and the compressed and encrypted object data corresponding to all the specified objects can be read from the storage medium or can be received through the transmission medium. Therefore, when the object data corresponding to the objects to-be-protected is all present in the storage medium or at the transmission end, and the scene description data has been read or received, object data corresponding to the specified objects is reproduced. This effectively prevents-illegal usage such as unauthorized copying of the objects to-be-protected.

According to an 18th aspect of the present invention, in the data processing method of the 15th aspect, when deciding that the compressed and encrypted object data is reproducible, the scene description data has been read from the storage medium or received through the transmission medium and all object data including the compressed and encrypted object data corresponding to the specified objects can be read from the storage medium or can be received through the transmission medium. Therefore, when the object data corresponding to the objects to-be-protected is all present in the storage medium or at the transmission end, and the scene description data has been read or received, object data corresponding to the specified objects is reproduced. This effectively prevents illegal usage such as unauthorized copying of the objects to-be-protected.

According to a 19th aspect of the present invention, in the data processing method of the 15th aspect, when deciding that the compressed and encrypted object data is reproducible, the scene description data and object data corresponding to all objects which compose the scene have been read from the storage medium or received through the transmission medium. Therefore, reproduction is limited such that the object data corresponding to each of the specified objects is not reproduced individually. This satisfactorily prevents illegal usage such as unauthorized copying of the objects to-be-protected.

According to a 20th aspect of the present invention, there is provided a data processing method which reads an encrypted bit stream from a storage medium or receives the encrypted bit stream through a transmission medium and performs reproduction of the encrypted bit stream, the encrypted bit stream being obtained by compressing a plurality of object data respectively corresponding to a plurality of objects which compose a scene and including object data as video data or audio data, to produce a plurality of compressed object data, and by encrypting at least compressed object data corresponding to specified objects which is predetermined among the plurality of compressed object data and scene description data which describes how the plurality of objects compose the scene, and the method comprises: a data production step for decrypting the encrypted bit stream to produce compressed object data corresponding to the specified objects; and a decompression step for decompressing compressed object data corresponding to all objects which compose the scene, to produce restored object data, and in the decompression step, the restored object data corresponding to all objects is written onto reference memories and read from the reference memories in such a way that the restored object data is subjected to secondary encryption before it is written onto the reference memories, and the restored object data is subjected to decryption for decrypting the secondary encryption after it is read from the reference memories. Therefore, at the data reading end or the data receiving end, the object data of the objects to-be-protected stored in the reference memories in the decompression process is prevented from being illegally utilized, thereby improving robustness of protection of the objects to-be-protected.

According to a 21st aspect of the present invention, there is provided a data processing method which reads an encrypted bit stream from a storage medium or receives the encrypted bit stream through a transmission medium and performs reproduction of the encrypted bit stream, the encrypted bit stream being obtained by compressing a plurality of object data respectively corresponding to a plurality of objects which compose a scene and including object data as video data or audio data, to produce a plurality of compressed object data, and by encrypting at least compressed object data corresponding to specified objects which is predetermined among the plurality of compressed object data and scene description data which describes how the plurality of objects compose the scene, and the method comprises: a data production step for decrypting the encrypted bit stream to produce compressed object data corresponding to the specified objects; and a decompression step for decompressing the compressed object data corresponding to all objects which compose the scene, to produce restored object data, and in the decompression step, restored object data of the respective objects is written onto corresponding reference memories and read from the corresponding reference memories in such a way that each of the restored object data is written onto a corresponding reference memory after it is subjected to secondary encryption, and each of the restored object data is read from the corresponding reference memory and then subjected to decryption for decrypting the secondary encryption. Therefore, at the data reading end or the data receiving end, the object data of the objects to-be-protected stored in the reference memories in the decompression process is prevented from being illegally utilized, for each object to-be-protected, thereby selectively improving robustness of protection of the objects to-be-protected.

According to a 22nd aspect of the present invention, there is provided a data processing apparatus which reads an encrypted bit stream from a storage medium or receives the encrypted bit stream through a transmission medium and performs reproduction of the encrypted bit stream, the encrypted bit stream being obtained by compressing a plurality of object data respectively corresponding to a plurality of objects which compose a scene and including object data as video data or audio data, to produce a plurality of compressed object data, and by encrypting at least compressed object data corresponding to specified objects which is predetermined among the plurality of compressed object data and scene description data which describes how the plurality of objects compose the scene, and the method comprises: decryption means for decrypting the encrypted bit stream to produce decrypted data; a plurality of data decompression means respectively provided for the plurality of objects, for decompressing corresponding compressed object data included in the decrypted data, to produce decompressed object data; and a plurality of memories respectively provided for the plurality of objects, for storing corresponding decompressed object data, and each of the plurality of data decompression means includes an encryption unit for subjecting the decompressed object data to secondary encryption before it is output to a corresponding memory, and a decryption unit for decrypting the secondary encryption of the decompressed object data after it is read from the corresponding memory. Therefore, at the data reading end or the data receiving end, the object data of the objects to-be-protected stored in the reference memories in the decompression is prevented from being illegally utilized (copied), for each object to-be-protected, thereby selectively improving robustness of protection of the objects to-be-protected.

According to a 23rd aspect of the present invention, there is provided a data processing method which reads an encrypted bit stream from a storage medium or receives the encrypted bit stream through a transmission medium and performs reproduction of the encrypted bit stream including display of an image, the encrypted bit stream being obtained by encrypting at least object data corresponding to specified objects which is predetermined among a plurality of object data respectively corresponding to a plurality of objects which compose a scene and including object data as video data or audio data, and scene description data which describes how the plurality of objects compose the scene, and the method comprises: extracting the scene description data from the encrypted bit stream; and limiting display such that an image based on the object data corresponding to each of the specified objects is prevented from being displayed individually, according to the scene description data. This makes it difficult to illegally utilize (conduct unauthorized copying of) the objects to-be-protected.

According to a 24th aspect of the present invention, there is provided a data processing method which reads an encrypted bit stream from a storage medium or receives the encrypted bit stream through a transmission medium and performs reproduction of the encrypted bit stream including display of an image, the encrypted bit stream being obtained by encrypting at least object data corresponding to specified objects which is predetermined among a plurality of object data respectively corresponding to a plurality of objects which compose a scene and including object data as video data or audio data and scene description data which describes how the plurality of objects compose the scene, and the method comprises the steps of: deciding whether or not encrypted object data corresponding to all the specified objects has been decrypted; and displaying the image based on the object data corresponding to the specified objects when deciding that the encrypted object data corresponding to all the specified objects has been decrypted. This makes it difficult to illegally utilize (conduct unauthorized copying of) the objects to-be-protected.

BRIEF DESCRIPTION OF THE DRAWINGS

FIGS. 2(a) and 2(b) are diagrams for explaining conception of an object coding scheme according to MPEG4 performed by the data processing apparatus of the first embodiment, wherein FIG. 2(a) shows a scene composed of a plurality of objects and FIG. 2(b) shows its hierarchical structure.

FIG. 3(a) is a diagram showing a multiplexed bit stream produced by the data processing apparatus of the first embodiment and FIG. 3(b) is a diagram showing an encrypted bit stream which has been scrambled.

FIGS. 4(a)–4(c) are diagrams for explaining an example of scene description used by the object coding scheme of the first embodiment, wherein FIG. 4(a) shows a content of a scene descriptor SD, FIG. 4(b) shows a content of an object descriptor(1), and FIG. 4(c) shows a content of an object descriptor (2).

FIG. 5 is a diagram showing flow of scrambling performed by a CPU of the data processing apparatus of the first embodiment.

FIGS. 7(a) and 7(b) are diagrams for explaining a data processing apparatus according to a third embodiment of the present invention, wherein FIG. 7(a) shows a structure of the data processing apparatus of the third embodiment and FIG. 7(b) shows a structure of object decompression means of a data processing apparatus according to modification 3 of the third embodiment.

DETAILED DESCRIPTION OF THE PREFERRED EMBODIMENTS

Now, preferred embodiments of the present invention will be described.

Embodiment 1

Figure 1:
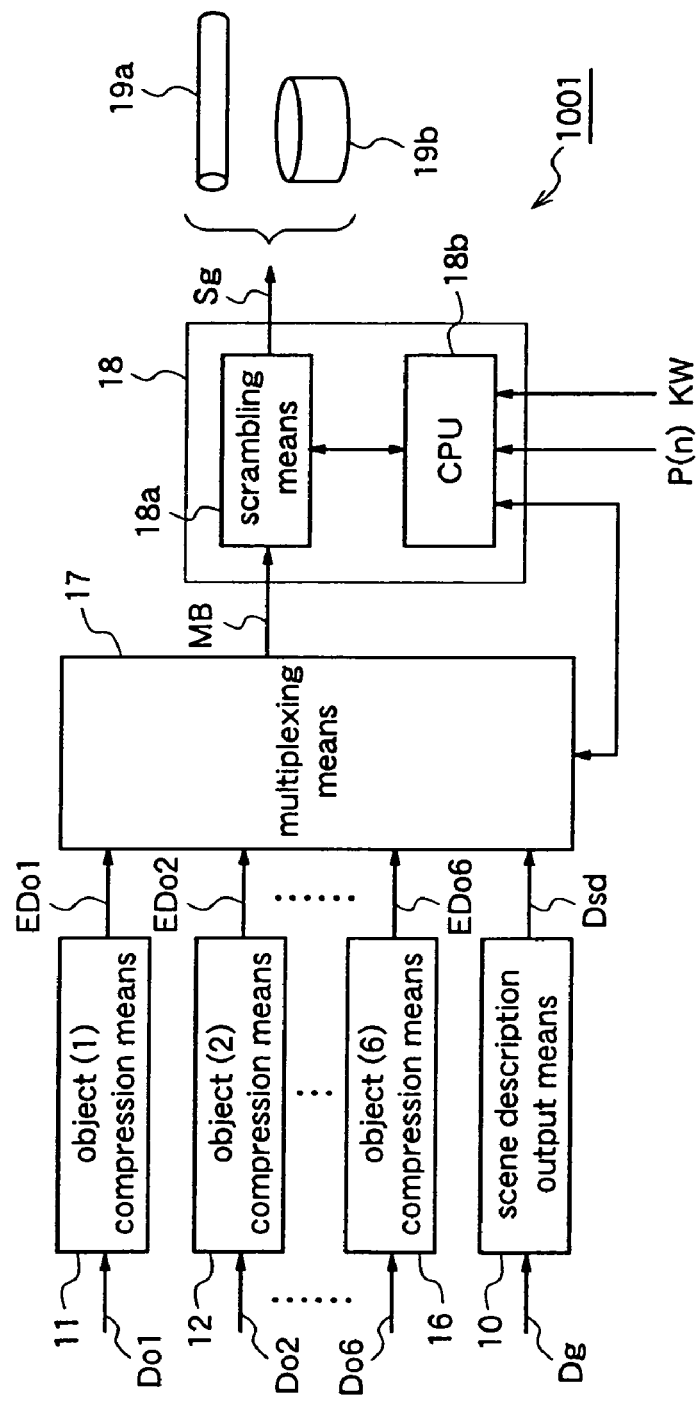
FIG. 1 is a block diagram showing a data processing apparatus according to a first embodiment of the present invention.

FIG. 1 is a block diagram showing a structure of a data processing apparatus according to a first embodiment of the present invention.

Turning now to FIG. 1, there is shown a data processing apparatus 1001 of the first embodiment corresponding to a data transmission-side apparatus, which is adapted to perform coding, scrambling (encryption), and multiplexing of an image signal Dg by a coding scheme according to MPEG4, and output the resulting data to-be-transmitted Sg. An image signal input to the data processing apparatus 1001 corresponds to moving pictures of various types of programs, and an image signal for each program is coded by time sharing. The data processing apparatus 1001 is also adapted to perform coding (compression) of the image signal Dg corresponding to each frame (one scene) for each of the objects composing each scene.

To be more detailed, the data processing apparatus 1001 includes a plurality of object compression means 11, 12, ..., 16 provided for the respective objects composing the scene for compressing object data corresponding to the respective objects, scene description output means 10 for generating scene description data DSd which describes how the respective objects compose the scene based on the image signal Dg and outputting the scene description data Dsd, and an object data production unit (not shown) for producing video data (object data) corresponding to the respective objects based on the image signal Dg.

Figure 2:
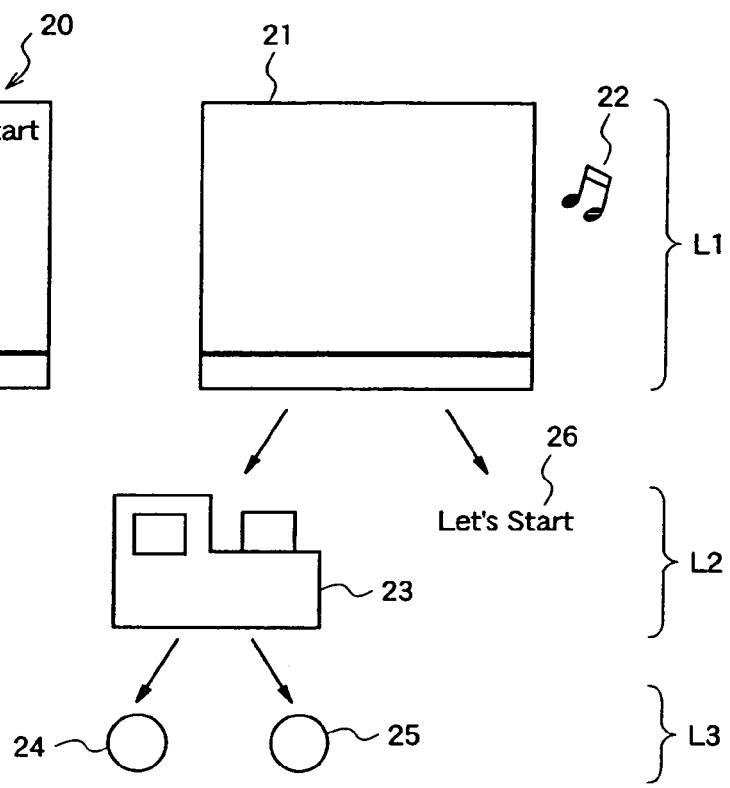

FIG. 2(a) shows a scene of the moving picture and FIG. 2(b) shows its hierarchical structure. As shown in these figures, a scene 20 is composed of 6 objects, i.e., 1st to 6th objects 21–26. In the data processing apparatus 1001, 1st to 6th object compression means compresses object data Do1–Do6 corresponding to the 1st to 6th objects 21–26, and outputs compressed object data EDo1–Edo6 of the 1st to 6th objects 21–26, respectively. In FIG. 1, the 1st, 2nd, ..., 6th object compression means are illustrated as object (1) compression means 11, object (2) compression means 12, ..., object (6) compression means 16, respectively. Therefore, the data processing apparatus 1001 has a capability of coding the image signal corresponding to the moving picture composed of 6 objects at maximum.

Figure 9:
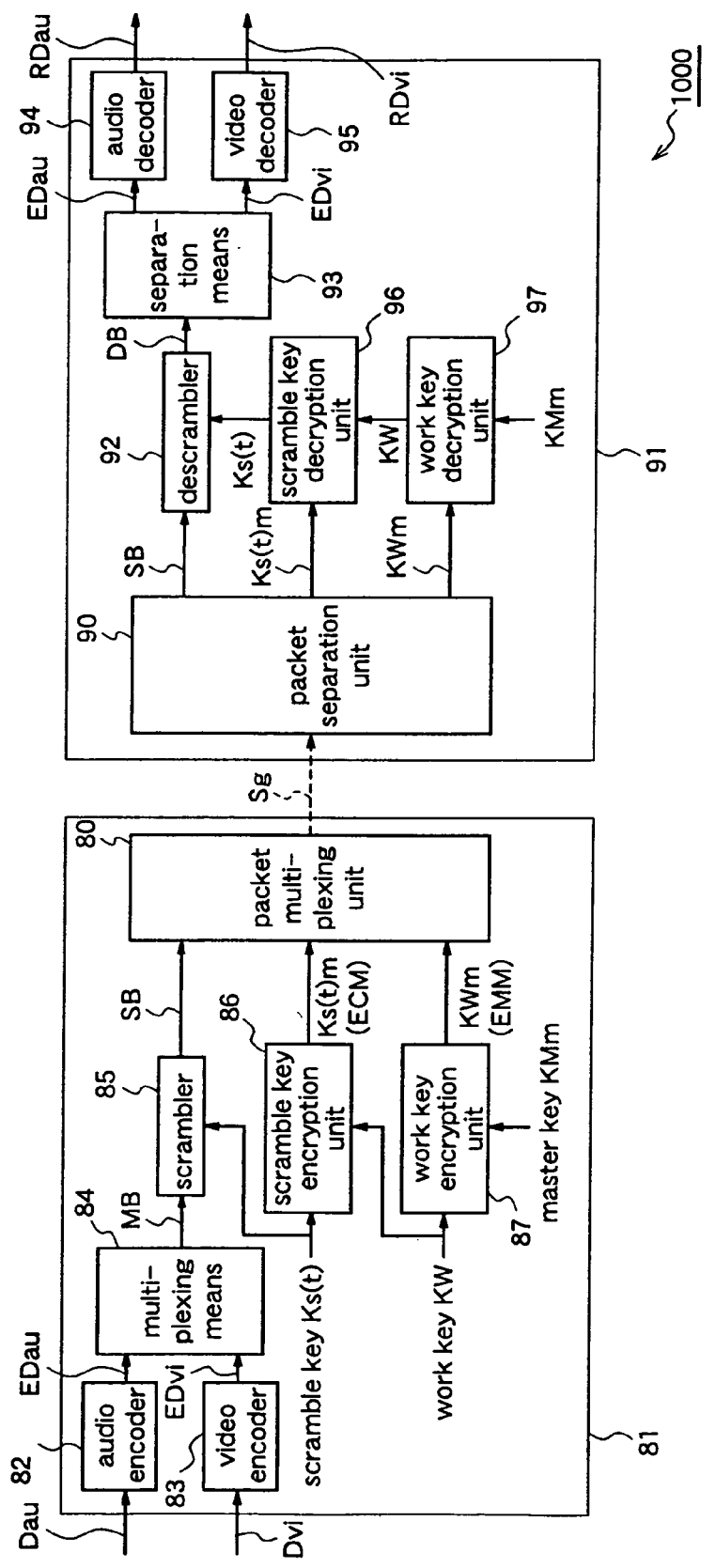
FIG. 9 is a diagram showing a data transmission/receiving system which adopts a conventional restricted receiving system.

The data processing apparatus 1001 further includes multiplexing means 17 for processing the compressed object data EDo1–EDo6 output from the respective compression means 11–16 and the scene description data Dsd according to a control signal such that these compressed data are each packetized as having a fixed-bit length and then multiplexed, and outputting a multiplexed bit stream MB, and a transmission-side copyright protection device 18 for performing scrambling and packet multiplexing of the multiplexed bit stream MB, and outputting data to-be-transmitted corresponding to the output of the packet multiplexing means 80 shown in FIG. 9 to a transmission medium 19a or a storage medium 19b. The transmission-side copyright protection device 18 comprises scrambling means 18a for scrambling the multiplexed bit stream MB, and a CPU (central processing unit) 18b for outputting respective control signals.

The scrambling means 18a is used for scrambling compressed object data (n) corresponding to an object to-be-protected (specified object) having a copyright to-be-protected among the plurality of objects composing the scene by using a scramble key Ks(n') for the object to-be-protected, as an encryption process for the multiplexed bit stream MB. The CPU 18b is used for controlling the multiplexing means 17 and the scrambling means 18a, encrypting the scramble key Ks(n') by using a work key KW to generate an encrypted scramble key Ks(n')m, and encrypting the work key KW by using the master key KMm to generate an encrypted work key KWm. The master key KMm varies from viewer to viewer who made a contract to watch a specified program, and all master keys KMm are stored in a key storage unit (not shown) of the data processing apparatus 1001.

The CPU 18b is also used for setting protection flags each indicating that copying is unauthorized (prohibited) or authorized (allowed), as access right information in object descriptors OD1–OD5 (see FIG. 4(b)) of the respective objects, based on protection specifying information stored in an information storage unit (not shown) of the data processing apparatus 1001 which is set by a user.

As complementary explanation of the scene 20 shown in FIG. 2(a), the scene 20 corresponding to the image of one frame, and the objects 21–26 (video object 21, audio object 22, video object 23, character object 26, video objects 24 and 25) composing the scene 20 is grouped such that each of them belongs to one of three layers L1–L3 as shown in FIG. 2(b). Specifically, the video object 21 as a background image and an audio object 22 belong to an upper-most first layer L1, the video object 23 as a foreground image and the character object 26 belong to a second layer L2 just below the upper-most first layer L1, and the video objects 24 and 25 associated with the video object 23 belong to a third layer L3 just below the second layer L2.

Operation and effects will be described.

In the coding scheme according to MPEG4, when transmitting the image signal Dg corresponding to the scene (one frame image), the image signal Dg is divided into image signals respectively corresponding to the objects composing the scene as shown in FIG. 2(b). The video data (object data) Do1, Do2, . . . , Do6 corresponding to the respective objects is compressed object by object.

More specifically, in the data processing apparatus 1001 at the data transmission end, the object compression means 11, 12, . . . 16, compress the object data, (video data, audio data, character data) corresponding to the objects 21–26, Do1, Do2, . . . , Do6, object by object, respectively, and output compressed object data EDo1, EDo2, . . . , EDo6.

The scene description output means 10 generates the scene description data Dsd which describes how the respective objects 21–26 compose the scene 20, based on the image signal Dg corresponding to the scene 20. The role of the scene description data Dsd is to inform the data processing apparatus at a receiving end of the number, display positions, and display timings of the respective objects composing the scene 20.

When the compressed object data EDo1, EDo2, . . . , EDo6, and the scene description data Dsd, are input to the multiplexing means 17, the multiplexing means 17 packetizes these data to generate a plurality of data packets. The multiplexing means 17 multiplexes respective data packets such that they have an optimum format for the transmission line (transmission medium) 19a or the storage medium 19b, and outputs the multiplexed bit stream MB. In this packetization, the respective data EDo1, EDo2, . . . , EDo6, and the Dsd are packetized into the plurality of data packets each having a fixed-bit length. FIG. 3(a) shows an example of the multiplexed bit stream MB. In general, in the multiplexed bit stream MB, a data packet which contains the scene description data Dsd is placed at the head thereof, followed by data packets which contain the compressed object data EDo1–EDo5 of the respective objects 21–25, respectively, which are repeatedly placed. As a data packet size, an optimum size is selected according to the transmission medium or the storage medium. The packet sizes of all the objects may be fixed, or vary object to object. Moreover, the packet size may vary with elapse of time.

Since a bit stream of the compressed object data EDo6 of the character object 26 is shorter than those of the other objects, this is inserted into the data packet which contains the scene description data Dsd.

A data packet Psd contains the scene description data Dsd and the compressed object data EDo6. Data packets P(1)o1 and P(2)o1 contain the compressed object data EDo1. Data packets P(1)o2 and P(2)o2 contain the compressed object data EDo2. The data packets P(1)o5 contains the compressed object data EDo5.

Figure 10:
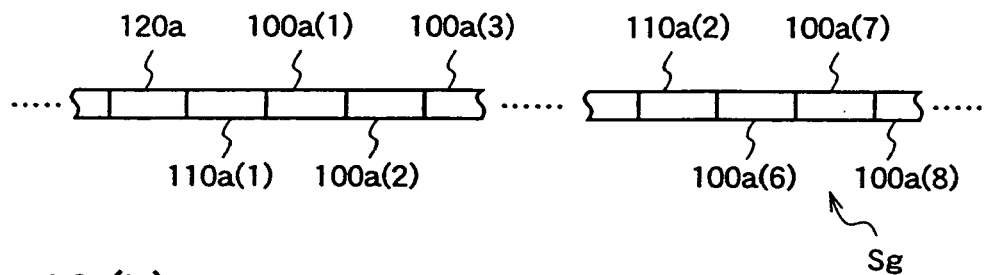
FIGS. 10(a)–10(d) are diagrams showing structures of packets of the multiplexed bit stream which is output from a data transmission-side apparatus in a conventional data transmission/receiving system.
Figure 10:
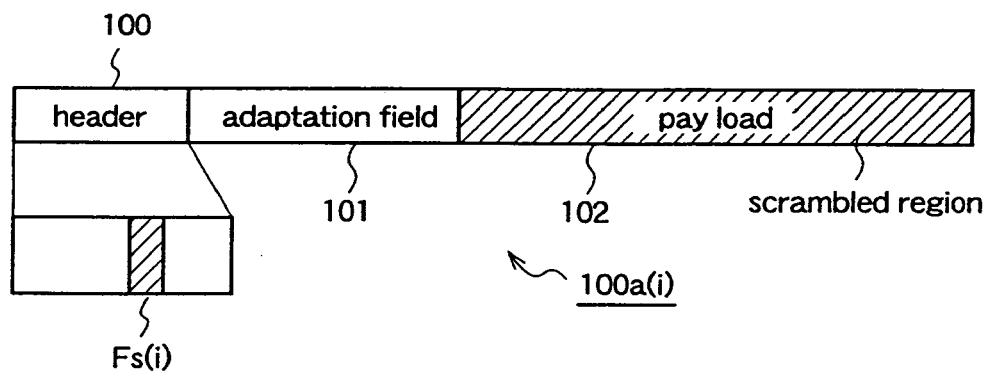
Figure 10:
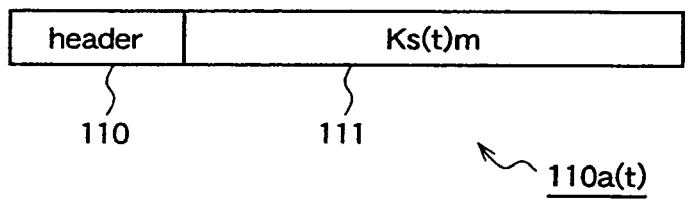
Figure 10:
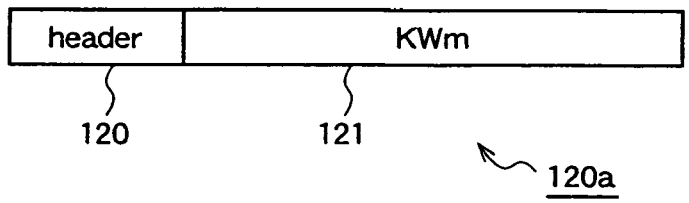

When the multiplexed bit stream MB is input to the protection device 18, the multiplexed bit stream MB is selectively scrambled object by object according to the control signal from the CPU18b, and the multiplexed data Sg (see FIG. 10(a)) corresponding to the output of the packet multiplexing unit 80 shown in FIG. 9 is output to the transmission medium 19a or the storage medium 19b. In this case, the scene description data Dsd and the compressed object data EDo1, EDo3, EDo4, and EDo5 of the video objects are scrambled differently, and the compressed object data EDo2 of the audio object is not scrambled. Hence, the compressed EDo2 corresponding to the audio object (2) can be reproduced without being descrambled, and duplicated after reproduced.

FIG. 3(b) shows an example of the scrambled bit stream SB included in the multiplexed data Sg.

In the scrambled bit stream SB, like the multiplexed bit stream MB, a data packet P'sd which contains the scene description data Dsd is placed at the head thereof, followed by data packets P'(1)o1, P'(2)o1, P(1)o2, P(2)o2, . . . , P'(1)o5, which contain the compressed object data EDo1, EDo2, . . . , EDo5, respectively, which are repeatedly placed.

In the scrambled bit stream SB, data parts (data regions which contain the compressed object data EDo1, EDo3, EDo4, and EDo5) of the respective data packets of the objects (1), (3), (4), and (5) having copyrights to-be-protected, have been scrambled. Also, a data region of the data packet which contains the scene description data Dsd has been scrambled.

The data packet P'sd comprises a header Hsd and a data part Rsd which contains the scene description data Dsd following the header Hsd. The data part Rsd has been scrambled. The data packet P'(1)o1 comprises a header Ho1 and a data part Ro1 which contains the compressed object data EDo1, and the data packet P'(1)o5 comprises a header Ho5 and a data part Ro5 which contains the compressed object data EDo5. The data parts Ro1 and Ro5 have been scrambled. The data packet P(2)o2 of the object (2) having no copyright to-be-protected comprises a header Ho2 and a data part Ro2 which contains compressed object data EDo2 which is unscrambled. Each of the data parts Rsd, Ro1, Ro2, and Ro5 corresponds to the Pay Load 102 of the data packet 100a(i) shown in FIG. 10(b), and in the data packet shown in FIG. 3(b), the adaptation field 101 of the data packet 100a(i) is omitted.

In FIG. 3(b), the scene description data Dsd, the compressed object data EDo1, and the compressed object data EDo5 have been scrambled differently, and dots and oblique lines express this difference.

In the scrambled bit stream SB in which the compressed object data is packetized for each of the objects in one scene, the following effects are achieved in contrast with the conventional scrambled bit stream in which compressed image data corresponding to one scene is packetized.

In the conventional example, a stream to-be-scrambled (encrypted) is one compressed image data corresponding to one scene, and therefore, scrambling is controlled indiscriminately. In other words, control is performed so that all or none of the objects composing the scene are scrambled. On the other hand, in this first embodiment, since the streams to-be-scrambled (encrypted) are the plural pieces of compressed video data among the respective objects composing the scene, these compressed video data are is selectively scrambled object by object. So, commonly used video objects or audio objects, which can be copied unlimitedly, are distinguishable from objects which require protection of their copyrights, and hence, protection by scrambling corresponding compressed object data is not conducted for them.

FIG. 4 is an explanatory view illustrating an example of the scene description data according to MPEG4. The scene description according to MPEG4 (description formed by information about how respective objects compose the scene) comprises scene descriptor SD and object descriptors OD1–OD5 as descriptors, and the scene descriptor SD represents the hierarchical structure of the scene 20 shown in FIG. 2(b) (see FIG. 4(a)).

The content of the scene descriptor SD is as follows. "2D object" A1 shows that the first layer L1 includes the video object 21 and the audio object 22 and the second layer L2 represented by "2D object" A2 exists. The "2D object" A2 shows that the second layer L2 includes the text object 26 and the video object 23, and the third layer L3 represented by "2D object" A3 exists. The "2D object" A3 shows that the third layer L3 includes the video objects 24 and 25. The "2D object" A1–A3 show that the objects included in corresponding layers L1–L3 are two-dimensional objects.

The scene descriptor SD also includes an object descriptor (1)OD1 to an object descriptor (5)OD5 which correspond to the objects 21–25, respectively.

The object descriptor (1) shows that an object number and a stream type of the corresponding object 21 is "1" and MPEG4 video, respectively, and corresponding access right information is "copying unauthorized". The object descriptor (2) shows that an object number and a stream type of the corresponding object 22 is "2" and MPEG4 audio, respectively, and corresponding access right information is "copying authorized". Each of the other object descriptors (3)–(5) also shows the object number, the stream type, and the access right information, as shown in FIGS. 4(b) and 4(c). The object number is used for identifying the stream corresponding to each object (compressed object data stored in the data packet) included in the multiplexed bit stream MB.

In the transmission-side data processing apparatus 1001 of the first embodiment, the access right information is added to the respective object descriptors. Therefore, in the receiving-side data processing apparatus (decoding apparatus), it is not necessary to check the scrambled bit stream SB to determine which of the streams has been scrambled. In addition, only the stream of the object which can be copied is extracted from the scrambled bit stream SB with ease.

Subsequently, scrambling and multiplexing performed by the transmission-side copyright protection device 18, will be described with reference to FIG. 5.

Flowchart shown in FIG. 5 shows a process for scrambling and multiplexing the multiplexed bit stream MB (see FIG. 3(a)) to produce the data to-be-transmitted Sg including the scrambled bit stream SB (see FIG. 3(b)).

Scrambling of the first embodiment is identical to that of the conventional example except the following respect.

The multiplexed bit stream according to MPEG4 comprises separate streams (compressed object data) for respective objects composing a scene. Therefore, scramble keys Ks(t) for as many as objects having copyrights to-be-protected (n') are generated, and the streams (compressed object data) of the objects having copyrights to-be-protected are scrambled by using corresponding scramble keys. The scramble key Ks(t) is represented by two variables, i.e., time "t" and the object number (n'). For example, a scramble key at time "t" for an "n'-th" object to-be-protected which is to be processed is represented as a scramble key Ks(n', t), although this is represented below as a scramble key Ks(n') regardless of time, for the sake of simplicity.

Along flow in FIG. 5, when the work key KW from the key storage unit of the data processing apparatus 1001 is input to the CPU 18b (Step 501), the CPU 18b encrypts the work key KW by using the master key KMm for each viewer from the key storage unit, and outputs the encrypted work key KWm stored in the EMM packet to the scrambling means 18a (Step 502). Then, the CPU 18b generates the scramble keys KS(0) and Ks(1) (Step 503), and then encrypts the scramble key Ks(0) by using the work key KW, and stores the resulting encrypted scramble key Ks(0)m in the ECM packet, to be output to the scrambling means 18a (Step 504).

The scene descriptor SD and the object descriptors OD1–OD5 included in the scene description data Dsd of the multiplexed bit stream MB are input to the CPU 18b through the scrambling means 18a (Step 505). The protection flag is set as access right information for each of the object descriptors OD1–OD5 object by object (Step 506). Specifically, the protection flag is set for each of the object descriptors OD1, OD3–OD5 of objects having copyrights to-be-protected (1), (3)–(5), and thereby corresponding access right information indicates that copying is unauthorized (prohibited). On the other hand, the protection flag is not set for the object descriptor OD2 of the object (2) which does not require protection of its copyright, and corresponding access right information indicates that copying is authorized (allowed). In this case, the protection specifying information P(n) for specifying object descriptors of objects to which protection flags are to be set, is supplied to the CPU 18b. The protection specifying information P(n) is preset by the user of the data processing apparatus 1001, and is stored in information storage unit (not shown) of the data processing apparatus 1001.

Then, the CPU 18b encrypts the scramble key Ks(1) by using the scramble key Ks(0), and adds the resulting encrypted scramble key Ks(1)m to the header HSd of the scene description data as shown in FIG. 3(b) (Step 507). Further, the scrambling means 18a encrypts the data part Rsd of the data packet which contains the scene description data by using the scramble key Ks(0) and outputs the resulting encrypted data (Step 508).

Thereafter, the CPU 18a sets counts n and n' to "1" (Step 509).

The count n corresponds to the object number of one of the plurality objects composing the scene, and processing the respective object data is performed according to the object number. Also, the count n' corresponds to the number of times of generation of the scramble keys, each of which is generated every time the object to-be-protected is encrypted. Hence, object data n is object data of the object number (n), i.e., object data of the object represented by the object descriptor (n), and the scramble key Ks(n') is generated in n'-th scrambling after scrambling starts.

The packet data (object data contained in the packet data) is input to the CPU 18b (step 510). The CPU 18b decides whether or not the input packet data corresponds to an object different from the object of packet data for which processing started(Step 511). When it decides "No", the CPU 18b decides whether or not this packet data corresponds to the object to-be-protected (Step 512).

When it decides "Yes", the CPU 18b encrypts compressed object data(n) by using the scramble key Ks(n'), and outputs the encrypted object data (Step 513). More specifically, the data part of the data packet which contains the compressed object data (n) is scrambled by using the scramble key Ks(n'). Then, the CPU 18b decides whether or not specified time has elapsed after scrambling starts or the scramble key Ks(n') is updated (Step 520).

When it decides "No" in Step 512, the CPU 18b immediately starts decision on elapsed time in Step 520.

When it decides "Yes" in Step 511, the CPU 18b decides whether or not the packet data corresponds to the object to-be-protected (Step 514). When it decides "Yes", the CPU 18b generates a scramble key Ks(n'+1) for this object to-be-protected (Step 515). The CPU 18b encrypts the scramble key Ks(n'+1) by using the scramble key Ks(n') and outputs the encrypted scramble key Ks(n'+1)m to the scrambling means 18a. The scrambling means 18a adds the encrypted scramble key Ks(n'+1)m to a header of the data packet which contains the compressed object data (n) (Step 516).

The scrambling means 18a scrambles (encrypts) the data part of the data packet which contains the compressed object data (n) by using the scramble key Ks(n') (Step 517).

Thereby, when the scrambled object data corresponding to a single object (compressed object data contained in the data packet whose data part has been scrambled) is taken out of the scrambled bit stream SB (see FIG. 3(b)), this scrambled object data cannot be descrambled.

To be specific, in order to descramble the scrambled object (4), a scramble key for the object (4) is necessary. This scramble key is included in the header of the stream (data packet) of the object (3), and has been encrypted by using the scramble key of the object 3, which becomes necessary. That is, to descramble the scrambled object(n), the streams of an object (n-1) and the following objects (object (n-2), object (n-3), . . . ). In other words, without all the object data having copyrights protected, which have been transmitted before desired scrambled object data, the desired object data cannot be descrambled. This prevents these objects from being extracted individually. The scramble key for each object to-be-protected is updated at regular time intervals for security like the conventional example. The scramble key is updated according to time required for scrambling the scene (an image corresponding to one frame) as a minimum unit.

The CPU18b increments the counts n and n' (Step 518), and then makes decision on the elapsed time (Step 520).

When it decides "No" in Step 514, the CPU 18b immediately increments the count n (Step 519), and then makes a decision on the elapsed time (Step 520).

When it decides "Yes" in Step 520, the CPU18b updates the scramble keys Ks(0) and KS(1), and then Steps 504–520 are performed again. When it decides "No" in Step 520, the CPU 18b decides whether or not all the data packets have been processed (Step 522). When the CPU 18b decides "No" in Step 522, Steps 510–522 are performed by the device 18 again, or otherwise, scrambling by the device 18 is ended.

Thus, in accordance with the first embodiment, the compressed object data EDo1, EDo3–EDo5 corresponding to the objects having copyrights to-be-protected, among the plurality of objects composing the scene, are encrypted by using predetermined encryption keys, respectively, and then the respective compressed object data EDo1–EDo6 and the scene description data Dsd are recorded or transmitted. Therefore, the object data is encrypted selectively for the objects to-be-protected.

In addition, since the scene description data includes the flags (access right information) for respective objects, each indicating whether or not a corresponding object is to be protected, at a data reading end or a data receiving end, it is decided whether or not decryption(descrambling) for the respective object data is necessary before it is received, whereby simplified and high-speed reproduction of the object data is achieved.

Further, the encryption key for encryption (scramble key Ks(n')) is stored in the scene description data, and recorded or transmitted. Hence, the encryption key as well as the encrypted object data is transmitted to the data receiving end. For this reason, at the data receiving end, it is not necessary to hold the encryption keys. If the encryption process at the recording end or the transmission end is intensive because of many encryption keys, the encryption keys to-be-held at the data reading end or the data receiving end are not increased.

Still further, when encrypting plural objects having copyrights to-be-protected, plural different encryption keys for the respective objects are used as the encryption keys (scramble keys), and thereby the encrypted object data is difficult to decrypt. Such encryption process provides robust protection of the individual objects to-be-protected.

Moreover, in the encryption process, the type of the encryption key to be used as the encryption key (scramble key Ks(n')) is changed with elapse of time. Thereby, the encrypted object data is difficult to decrypt. Such encryption process also provides robust protection of the objects to-be-protected.

While in the first embodiment the scene description according to MPEG4 has been discussed, any descriptor according to a coding scheme according to HTML, JAVA, or MPEG may be used so long as it represents attribute of an object.

While the scene description data Dsd is scrambled in Step 508 as shown in FIG. 5, the scene description data itself includes no object data, and therefore scrambling of the scene description data may be dispensed with. Also in this case, copyrights can be protected object by object.

While in the first embodiment the scramble key is also added to the header of the data packet which contains the scene description data, this may be omitted and the scramble keys may be added to only the data packets of the object data.

While in the first embodiment the scene description data includes the flags (access right information) indicating whether or not corresponding objects are to be protected, the scramble keys may be unencrypted or encrypted and then added to the object descriptors of the scene description data so long as security of the scene description data is maintained.

Embodiment 2

Figure 6:
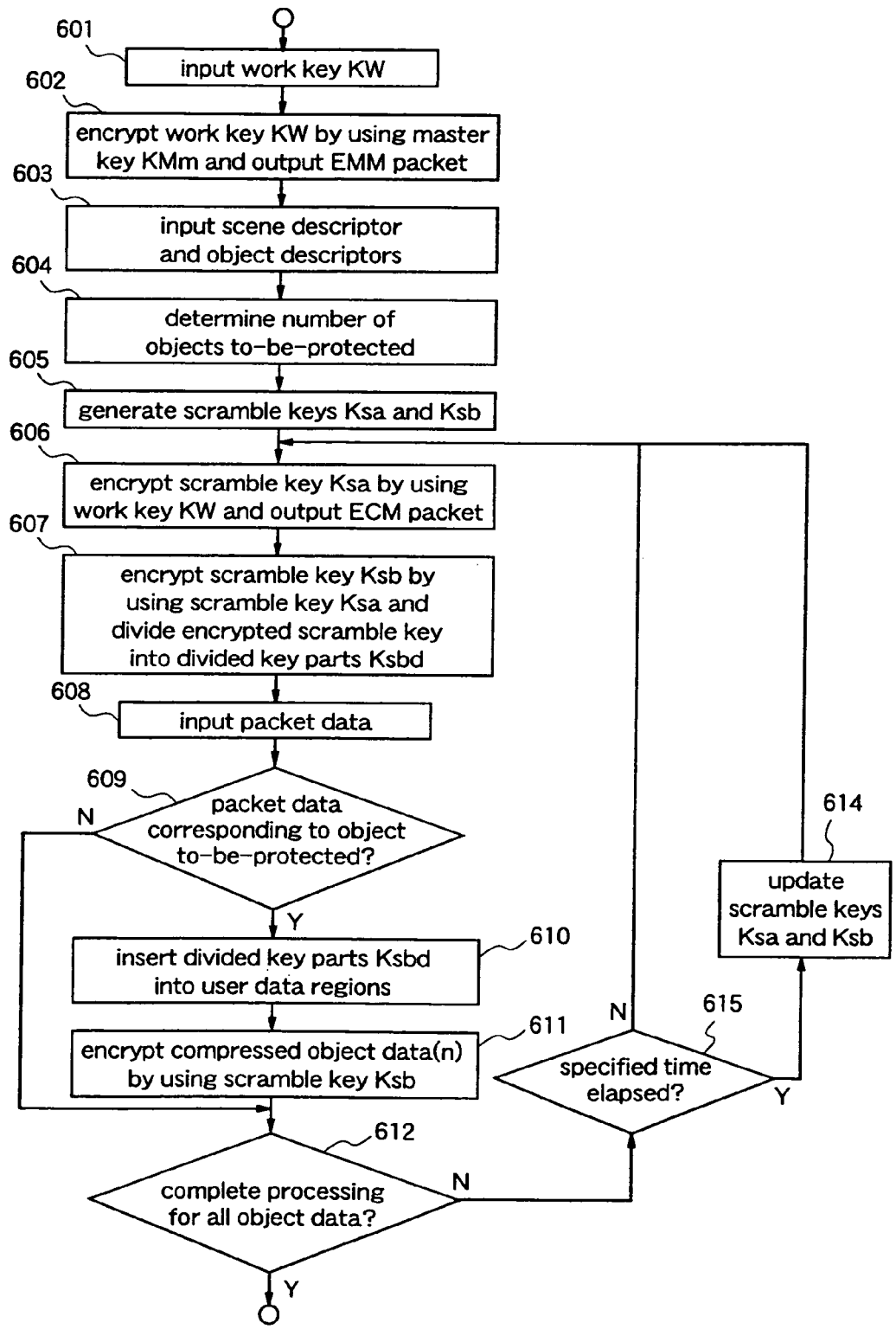
FIG. 6 is a diagram showing flow of scrambling performed by a CPU of a data processing apparatus of a second embodiment.

FIG. 6 is a diagram for explaining a data processing apparatus according to a second embodiment of the present invention and showing flow of an encryption process (scrambling process) performed by the data processing apparatus at the transmission end.

The data processing apparatus of the second embodiment differs from the data processing apparatus 1001 of the first embodiment in the scrambling process, i.e., operation of the CPU 18b for controlling the scrambling means 18a.

In this second embodiment, the CPU 18b has replaced the process for generating the scramble key Ks(n') for each object to-be-protected of the first embodiment by a process for generating a first scramble key Ksa comprising a bit stream as long as that of the scramble key of the first embodiment and a second scramble key Ksb comprising a bit stream longer than that of the scramble key of the first embodiment.

In addition, the compressed object data corresponding to the respective objects to-be-protected is encrypted by using the second scramble key Ksb, which is encrypted by using the first scramble key Ksa. The encrypted second scramble key Ksbm is divided into a plurality of parts respectively corresponding to the objects to-be-protected, and the resulting divided key parts are inserted into user data regions of the data packets which contain the compressed object data of the corresponding objects to-be-protected.

Hereinafter, a description will be made to explain the scrambling process (encryption process) for the multiplexed bit stream MB performed by the data processing apparatus of the second embodiment, with reference to FIG. 6.

Initially, the work key KW is input to the CPU 18b (Step 601). The work key KW is encrypted by using the master key KMm and output in the form of the EMM packet (Step 602).

The scene description data is input to the CPU 18b (Step 603) The CPU 18b sets the number of objects to-be-protected "n" according to the protection specifying information P(n) for specifying objects to-be-protected, specified by the user.

The CPU 18b generates the scramble key Ksb comprising the bit stream longer than that of the scramble key of the first embodiment and the scramble key Ksa comprising the bit stream of a normal length (Step 605). The CPU 18b encrypts the scramble key Ksa by using the work key KW, stores an encrypted scramble key Ksam in the ECM packet, and outputs the encrypted scramble key Ksam to the scrambling means 18a (Step 606).

Then, the CPU 18b encrypts the scramble key Ksb by using the scramble key Ksa and divides the encrypted scramble key Ksbm (Step 607). In this case, the encrypted scramble key Ksbm is bit-divided into a plurality of scramble key parts. By way of example, when dividing the encrypted scramble key Ksbm into 4 divided parts, the scramble key "1001000111" is divided into "100", "10001", and "11".

When the data packet (compressed object data contained in the data packet) is input to the CPU 18b (Step 608), the CPU 18b decides whether or not the packet data corresponds to the object to-be-protected (Step 609). When the CPU 18b decides "Yes" in Step 609, the scrambling means 18a inserts the divided key parts Ksbd into the user data regions or headers of the data packets which contain the streams (compressed object data) of the objects to-be-protected, respectively (step 610). Note that the data regions or the headers are unscrambled.

The scrambling means 18a scrambles the stream (object data) of the object to-be-protected (n) by using the scramble key Ksb (Step 611). Then, the CPU 18b decides whether or not processing for all the packet data of one program performed by the copyright protection device 18 is completed (Step S612).

When it decides "No" in Step 609, the CPU 18b immediately starts decision on whether or not processing for all the packet data is completed (Step 612).

When it decides "No" in Step 612, the CPU 18b decides whether or not specified time has elapsed after scrambling starts or the scramble key is updated (Step 615).

When it decides "Yes" in Step 615, the CPU 18b updates the scramble keys Ksa and Ksb (Step 614), or otherwise, Steps 606–615 are performed again without updating the scramble keys in Step 614.

Thus, in accordance with the second embodiment, the scramble key Ksb for all the objects to-be-protected of the moving picture of a specific program is encrypted by using the scramble key Ksa, and then the resulting encrypted scramble key ksbm is divided into the key parts respectively corresponding to the objects to-be-protected, which are inserted into the unscrambled user data regions of the data packets of the objects to-be-protected, and the streams of the objects to-be-protected (compressed object data contained in the data parts of the data packets) are scrambled by the encrypted scramble key Ksbm and output. Therefore, the scramble key Ksb cannot be reproduced unless the data packets of all the objects to-be-protected are extracted. In other words, if data packets of a desired object to-be-protected are extracted from the scrambled bit stream, the object data of the desired object cannot be reproduced. This provides robust protection against unauthorized copying of individual objects to-be-protected.

In this second embodiment, the encrypted scramble key Ksbm is divided into key parts as many as the "n" objects to-be-protected such that the divided key parts have different bit lengths. As alternatives, the followings are conceived.

For instance, the encrypted scramble key Ksbm may be divided such that the divided key parts have the same bit length. In this case, a specified bit, for example, a 4th bit starting from the head of the divided key parts may be changed such that "1" or "1"→"1" or "0". The specified bit may be fixed such that it is always either "1" or "0". The specified bit may be obtained by XOR(exclusive-OR)ing "1" or "0" and "1" or "0". Between the specified bit of the object being scrambled and the specified bit of an object to be subsequently scrambled, exchange may be made.

The encrypted scramble key Ksbm may be bit-divided arbitrarily on condition that the scramble key Ksb cannot be reproduced without the packet data of all the objects to-be-protected.

While in the first and second embodiments the transmission-side copyright protection device 18 is adapted to add scramble keys for respective objects to headers or user data regions of the data packets which contain corresponding object data, the transmission method of the scramble keys is not limited to this.

For instance, the scramble keys with higher security may be stored in packets different from the data packets which contain the object data, and transmitted.

The scrambling processes performed by the CPU 18b in the copyright protection devices 18 of the first and second embodiments differ from each other, but this is only illustrative.

The encryption process for the objects to-be-protected performed by the copyright protection device 18, may be performed arbitrarily so long as the encrypted object data of any object to-be-protected cannot be decrypted without at least the encrypted object data of all the objects to-be-protected of the scene, or encrypted object data of a single object, if extracted, cannot be decrypted.

The encryption process of the second embodiment is more advantageous over that of the first embodiment in that the data parts of the data packets of the objects to-be-protected are encrypted simply and descrambling cannot be performed without the packet data of all the objects to-be-protected, but has the following drawback.

If the portions in the data packets into which the divided key parts of the scramble key Ksb are inserted are extracted, then descrambling is performed with ease.

Accordingly, in the data transmission/receiving system, it becomes necessary to select one of the data processing apparatus of the first embodiment and the data processing apparatus of the second embodiment as an optimum data processing apparatus according to system configuration.

Embodiment 3

FIGS. 7(a) and 7(b) are diagrams showing a data processing apparatus according to a third embodiment of the present invention, wherein FIG. 7(a) shows a structure of the data processing apparatus.

Turning now to FIG. 7(a), there is shown a data processing apparatus 1003 of the third embodiment, which corresponds to a data receiving-side apparatus adapted to receive the multiplexed and transmitted data (multiplexed data) Sg including the scrambled bit stream SB obtained by coding and scrambling (encrypting) the image signal corresponding to one frame image (scene) of the moving picture by the coding scheme according to MPEG4, which is transmitted from the data processing apparatus 1001, and reproduce the image signal. The data processing apparatus 1003 includes descrambling means 71 for extracting the scrambled bit stream SB which has been packetized, from the multiplexed data Sg and descrambling the scrambled bit stream SB according to the control signal to produce a descrambled bit stream DB, and separation means 73 for separating the scene description data and the compressed (encoded) object data of respective objects from the descrambled bit stream DB.

The data processing apparatus 1003 further includes a plurality of object decompression means 741–746 provided for the respective objects for decompressing corresponding compressed object data according to control signals, and scene description reproduction means 70 which receives the scene description data separated from the descrambled bit stream DB and outputs composition information Csd such as the scene descriptor necessary for scene composition and the object descriptors.

Figure 7:
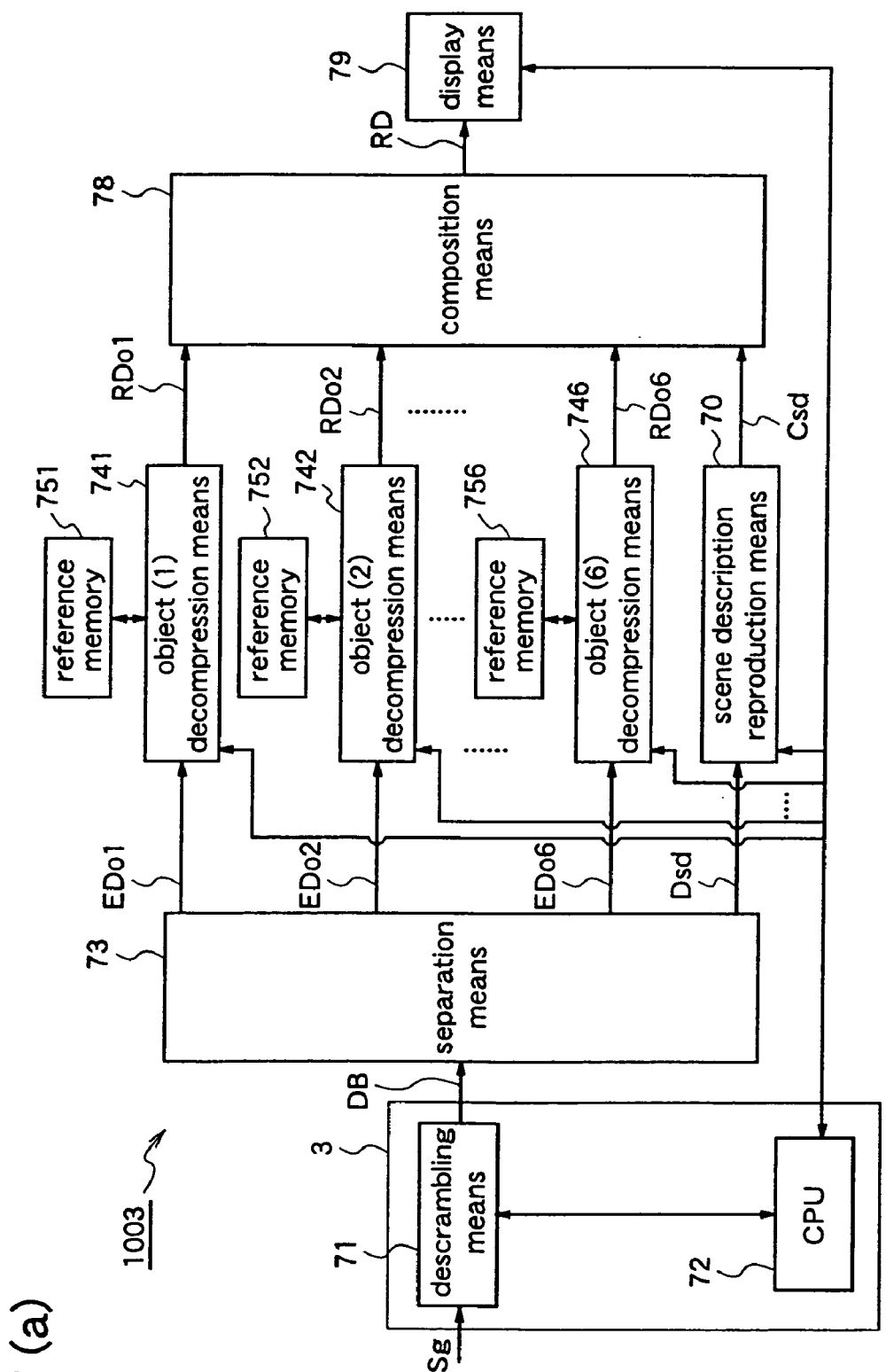
Figure 7:
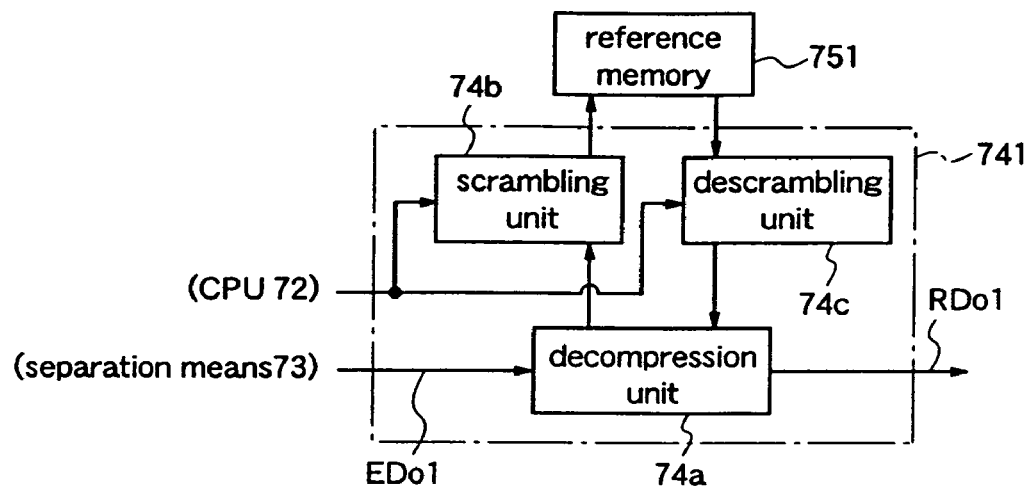

The plurality of object decompression means 741–746 are provided in a way adapted to the data transmission-side apparatus 1001 and used for decompressing compressed object data EDo1–EDo6 of the first to sixth objects 21–26 (see FIG. 2) and outputting decompressed object data Rdo1–Rdo6. In FIG. 7, the object (1) decompression means 741, the object (2) decompression means 742, . . . the object (6) decompression means 746 correspond to the first, second, . . . , the sixth object compression means, respectively.

In MPEG coding scheme, as image data corresponding to a current frame, except specified frames, difference image data between image data of a previous frame and the image data of the current frame is encoded and transmitted, and therefore, it is necessary to store image data of a restored previous frame when decompressed object data is produced. To implement this, the data processing apparatus 1003 includes 6 reference memories, i.e., reference memories 751, 752, . . . 756 corresponding to the object decompression means 741, 742, . . . , 746, respectively.

The data processing apparatus 1003 still further includes composition means 78 for compositing the decompressed object data Edo1–Edo6 to provide a restored image signal RD corresponding to a scene according to the composition information Csd obtained from the scene description data Dsd, display means 79 which receives the restored image signal RD and outputs an image display signal Ds used for displaying the scene on a monitor (not shown), and a CPU 72 for controlling the descrambling means 71, the respective decompression means 741, 742, . . . , 746, the scene description reproduction means 70, and the display means 79 by using respective control signals. The descrambling means 71 and the CPU 72 constitute the receiving-side copyright protection device 3.

Furthermore, the data processing apparatus 1003 includes a key storage unit (not shown) for storing a master key KMm unique to the apparatus distributed by the IC card and the like.

Operation will now be described.

Figure 8:
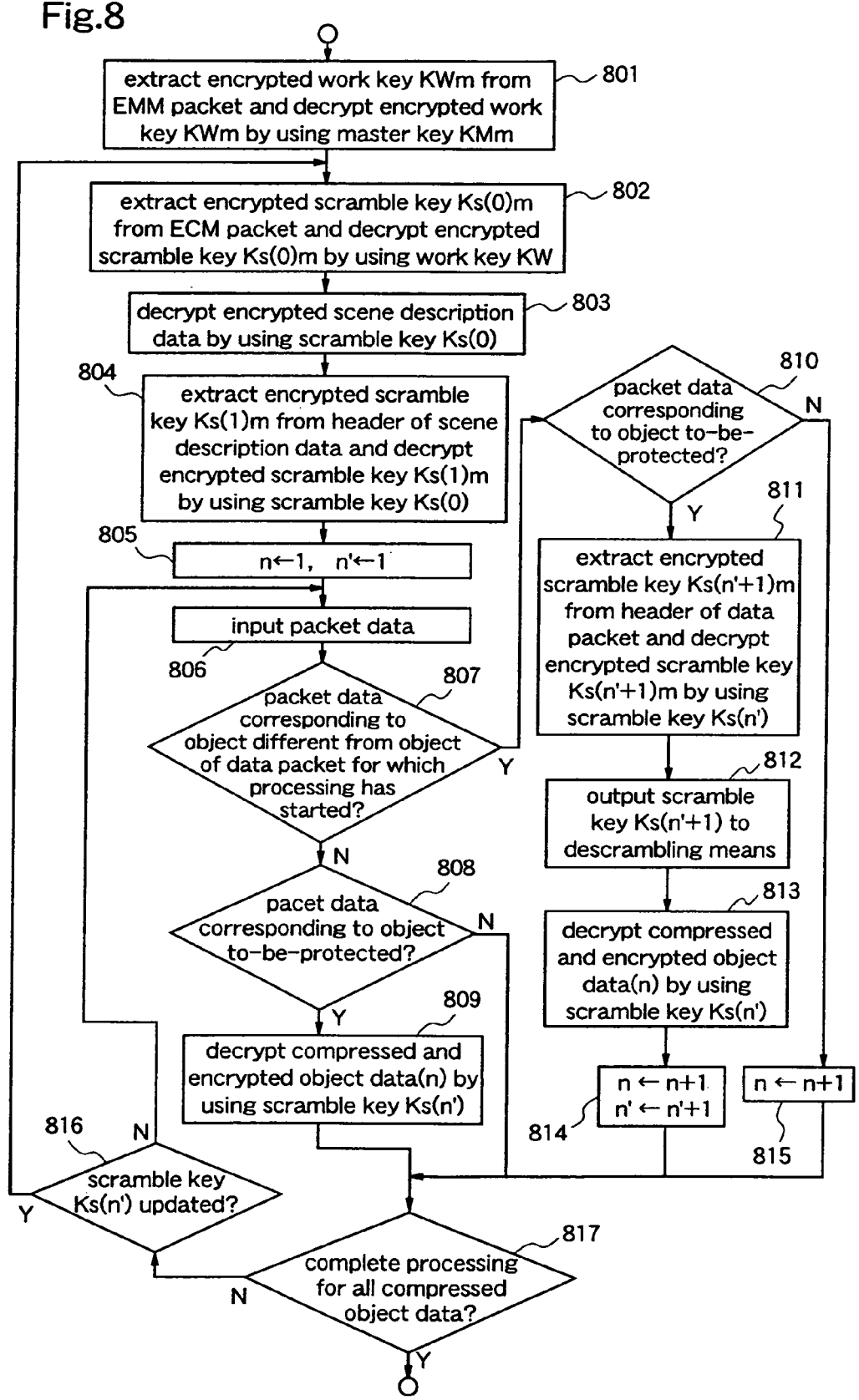
FIG. 8 is a diagram showing flow of descrambling performed by a CPU of the data processing apparatus of the third embodiment.

FIG. 8 is a flowchart for explaining operation of the copyright protection device 3 and showing processing in which the descrambling means 71 descrambles the multiplexed data Sg under control of the CPU 72. The processing performed by the CPU 72 flows in the reversed order of the processing of the CPU 18b of the first embodiment.

When the multiplexed data Sg output from the data processing apparatus 1001 of the first embodiment is input to the copyright protection device 3 of the data processing apparatus 1003 of the third embodiment, the descrambling means 71 extracts the packetized and scrambled bit stream SB, the ECM packets, and the EMM packets from the multiplexed data Sg and descrambles the scrambled bit stream SB according to the control signal from the CPU 72.

When the EMM packet is output from the descrambling means 71 to the CPU 72, the CPU 72 extracts the encrypted work key KWm from the EMM packet, and decrypts the encrypted work key KWm by using the distributed master key KMm to generate the work key KW (Step 801). Subsequently, when the ECM packet is output from the descrambling means 71 to the CPU 72, the CPU 72 extracts the encrypted scramble key Ks(0)m from the ECM packet, and decrypts the encrypted scramble key Ks(0)m to restore the scramble key Ks(0) (Step 802).

The descrambling means 71 decrypts the encrypted scene description data in the scrambled bit stream by using the scramble key Ks(0) from the CPU 72 (Step 803). The CPU 72 extracts the encrypted scramble key Ks(1)m from the header of the scene description data Dsd and decrypts the encrypted scramble key Ks(1) by using the scramble key Ks(0) to restore the scramble key Ks(1) (Step 804).

Thereafter, in Step 805–817, for each of the objects to-be-protected, a corresponding encrypted scramble key Ks(n')m is extracted and decrypted, and the compressed object data EDon' stored in the data packet P'(k)on' is descrambled in the order of ascending object numbers (n') represented as the object descriptors. The data packet P'(k)on' is a k-th data packet which contains the compressed object data EDon' corresponding to an n'-th object to-be-protected. Since the objects to-be-protected are the objects 21, 23, 24, and 25, the number n' lies in 1–4. Processing in Step 805–817 will be described in detail.

Initially, the counts n and n' identical to those of the first embodiment are respectively set to "1" (Step 805). The packet data (data stored in each data packet) is input to the descrambling means 71 (Step 806). The CPU 72 decides whether or not the input data packet corresponds to an object different from the object of packet data for which processing has already started (step 807).

When it decides "No" in Step 807, the CPU 72 decides whether or not the input packet data corresponds to the object to-be-protected (Step 808). When the CPU 72 decides "Yes" in Step 808, the descrambling means 71 descrambles (decrypts) the compressed and scrambled (encrypted) object data by using the scramble key Ks(n') to restore the compressed object data. Then, the CPU 72 decides whether or not processing for all the packet data by the protection device 3 is completed (Step 817).

When it decides "No" in Step 808, the CPU 72 immediately makes decision in Step 817.

When it decides "Yes" in Step 807, the CPU 72 decides whether or not the input data packet data corresponds to the object to-be-protected (Step 810). When it decides "Yes" in Step 810, the CPU 72 extracts the encrypted scramble key Ks(n'+1)m from the header of the data packet corresponding to the object (n) and decrypts the encrypted scramble key Ks(n'+1)m by using the scramble key Ks(n') (Step 811).

The resulting scramble key Ks(n'+1) is output from the CPU 72 to the descrambling means 71 (Step 812). The descrambling means 71 descrambles the compressed and scrambled object data stored in the data packet of the object (n) by using the scramble key Ks(n') to restore the compressed object data (Step 813). Then, the CPU 72 increments the counts n and n' by one (Step 814) and then decides whether or not processing for all the packet data is completed (Step 817).

When it decides "No" in Step 817, the CPU 72 decides whether or not the scramble key Ks(n') is updated with elapse of time (Step 816). When the CPU 72 decides "Yes" in Step 816, Steps 802–817 are performed again by the protection device 3, or otherwise, Steps 806–817 are performed again.

Thereafter, for the descrambled bit stream (restored bit stream) DB, the separation means 73 performs data separation. Thereby, the scene description data Dsd is extracted from the data packet of scene description and the compressed object data corresponding to the respective objects are extracted from the data packets of the respective objects. The object decompression means 741, 742, . . . , 746 decompress the compressed object data Edo1, Edo2, . . . , EDo6 of the respective objects and converts them into displayable data (decompressed object data RDo1, RDo2, . . . RDo6). The scene description reproduction means 70 generates the composition information Csd used for compositing the decompressed object data RDo1, Rdo2, . . . , RDo6 of the respective objects, based on the scene description data Dsd.

The composition means 78 composites the decompressed object data output from the respective object decompression means 741, 742, . . . , 746, according to the composition information Csd based on the scene description data Dsd, to produce a restored image signal RD corresponding to a scene (frame image). The display means 79 displays the image based on the restored image signal RD.

Thus, in accordance with the third embodiment, for the scrambled (encrypted) data obtained by selectively scrambling (encrypting) the compressed object data of the plural objects composing the scene and the scene description data which describes how the plural objects compose the scene, reproduction including decryption of the encrypted data and display of the respective object data, is performed, depending upon whether or not the scene description data and the respective object data have been encrypted. Therefore, decryption is performed for the scrambled bit stream in which the object data of the respective objects is sequentially scrambled, and the header of the data packet of current object data contains the scramble key used for scrambling subsequent object data. Thereby, based on the multiplexed and transmitted data Sg including the scrambled bit stream SB output from the data processing apparatus of the first embodiment, the image signal RD corresponding to the scene is reproduced and displayed.

While in the third embodiment the video data (object data) of the respective objects included in the scrambled bit stream SB is the compressed image data, this may be uncompressed data.

In this case, the objects decompression means and the reference memories for the respective objects may be dispensed with, resulting in a simplified structure of the receiving-side data processing apparatus.

While in the third embodiment the display means 79 displays the image of the image signal RD output from the composition means 78, the CPU 72 may execute control so that the display means 79 displays only the image of the image signal RD which satisfies specific conditions.

These specific conditions include descrambling of the video data of the objects to-be-protected composing the scene (decryption condition), completion of decompression for the object data of all the objects required for scene composition (decompression condition) completion of composition of the object data of all the objects required for display of the scene (composition condition), and the like, which are to be confirmed by the CPU 72.

As the specific conditions, all of or one or two of the decryption condition, the decompression condition, and the composition condition may be set.

Modification 1 of the Third Embodiment

Hereinafter, a description will be made to explain the data processing apparatus as the data processing apparatus according to the modification 1 of the third embodiment which displays the image when the decryption condition is satisfied.

Figure 13:
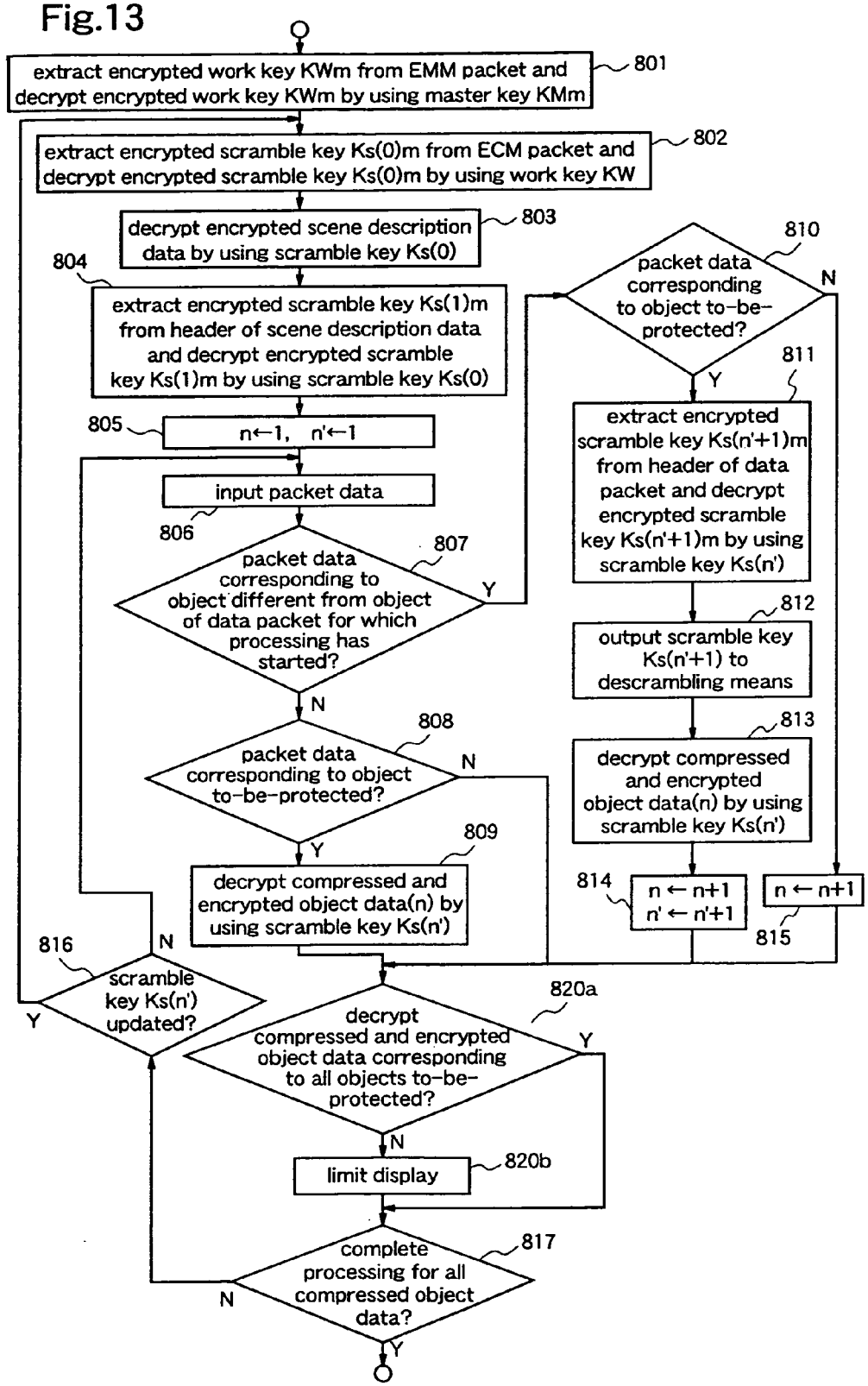
FIG. 13 is a diagram showing descrambling performed by the data processing apparatus according to modification 1 of the third embodiment.

FIG. 13 is a diagram for explaining operation of the data processing apparatus of the modification 1 and showing flow of descrambling performed by the data processing apparatus.

The descrambling of this data processing apparatus includes Step 820a in which the CPU 72 decides the condition of display limit and Step 820b in which the CPU 72 instructs the display means 79 to limit display, before descrambling in Step 817 of the third embodiment. The other Steps in descrambling are identical to those of the third embodiment.

To be specific, in modification 1 of the third embodiment, the CPU 72 decides whether or not the encrypted compressed object data of all the objects to-be-protected have been decrypted (Step 820a), before the CPU 72 decides whether or not the compressed object data of all the objects have been processed by the receiving-side copyright protection device 3. When it decides "No" in Step 820a, the CPU 72 posts an instruction "limit of display" to the display means 79 (Step 820b). Thereby, the display means 79 is prohibited from reproducing the image signal corresponding to the scene including the objects to-be-protected. On the other hand, when it decides "Yes" in Step 820a, the CPU 72 makes a decision in Step 817 without Step 820b for posting the "limit of display" to the display means 79.

As conditions other than the conditions described above, the following are conceived.

i) When in the data receiving-side data processing apparatus, it is detected that all encrypted object data of the objects to-be-protected is readable from the storage medium or receivable through the transmission medium, all the object data is reproduced.

ii) When in the receiving-side data processing apparatus, the scene description data has been read or received and it is detected that all encrypted object data of the objects to-be-protected is readable from the storage medium or receivable through the transmission medium, all the object data is reproduced.

iii) When in the receiving-side data processing apparatus, the scene description data has been read or received and it is detected that object data of all the objects composing the scene is readable from the storage medium or receivable through the transmission medium, all the object data is reproduced.

iv) When in the receiving-side data processing apparatus, the scene description data or all the object data composing the scene have been read from the storage medium or received through the transmission medium, all the object data is reproduced.

Under these conditions, the image corresponding to the scene is reproduced and displayed. That is, the display means 79 outputs only an image signal corresponding to a composite scene to a display (display monitor). This makes it difficult to take out the video data of the objects to-be-protected from the display means 79, which provides robust protection of the copyright in the data transmission/receiving system. To detect these conditions, the CPU 72 inquires a storage medium or a server at a transmission end of the existence/non-existence of the respective object data or the scene description data.

Modification 2 of the Third Embodiment

Hereinafter, a data processing apparatus according to a modification 2 of a third embodiment, will be described.

Figure 12:
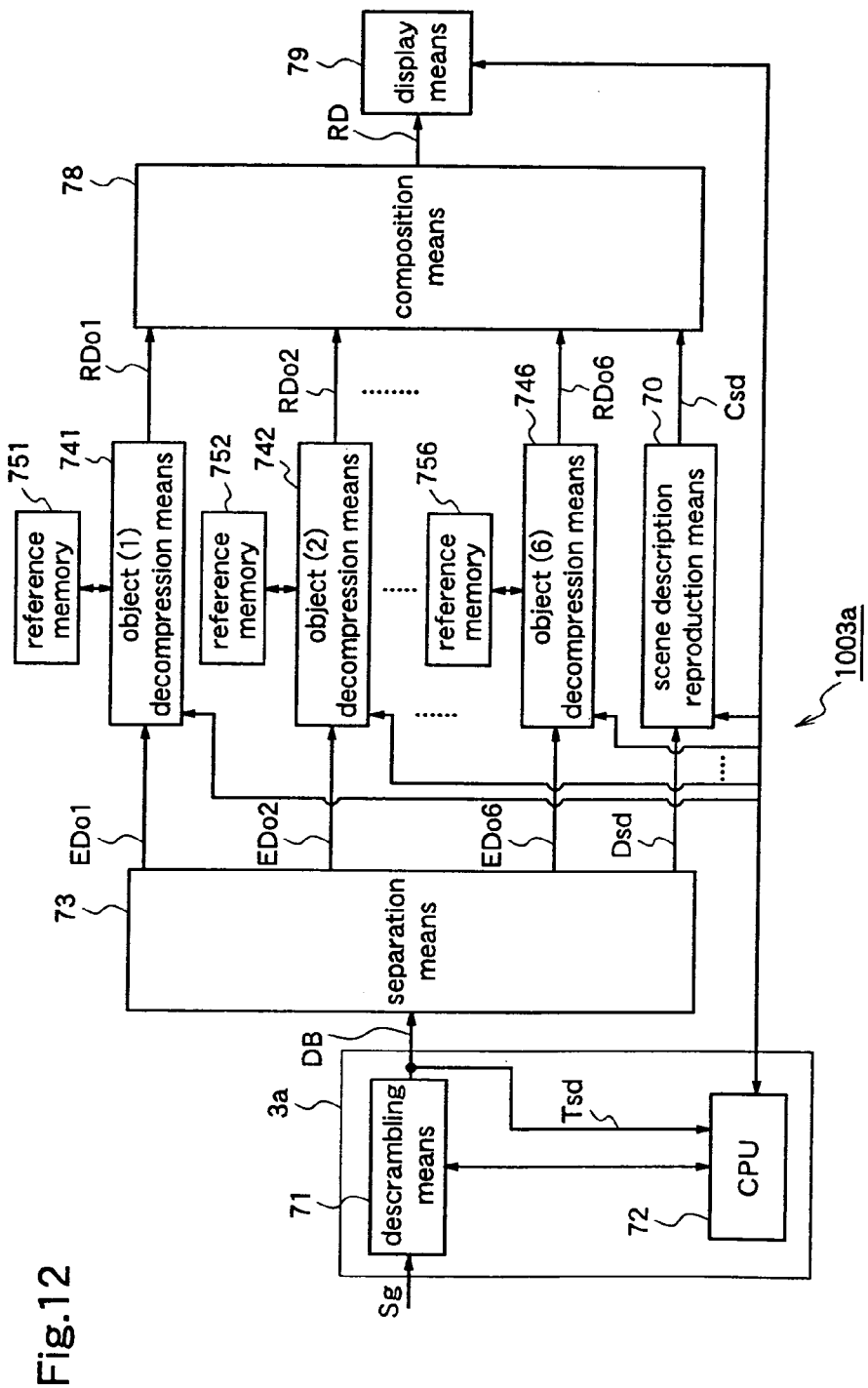
FIG. 12 is a diagram showing a structure of a data processing apparatus according to modification 2 of the third embodiment.

FIG. 12 is a block diagram for explaining the data processing apparatus of the modification 2 of the third embodiment.

Turning to FIG. 12, there is shown a data processing apparatus 1003. In the data processing apparatus 1003a, the receiving-side copyright protection device 3 of the data processing apparatus 1003 of the third embodiment has been replaced by a receiving-side copyright protection device 3a which includes descrambling means 71 for descrambling the "multiplexed and transmitted" (multiplexed) data Sg including the scrambled bit stream SB and outputting a descrambled bit stream DB, and a CPU 72a for controlling the display means 79 according to display timing information Tsd included in the scene description data of the bit stream DB. The other components of the data processing apparatus 1003a are identical to those of the data processing apparatus of the third embodiment 1003.

The CPU 72a includes timing detection means (not shown) which receives the descrambled bit stream DB output from the descrambling means 71 and detects the display timing information Tsd of time when the objects to-be-protected are displayed individually, based on the scene description data of the bit stream DB. The CPU 72a is adapted to control the display means 79 so that it will not reproduce and display the object data of the objects to-be-protected independently, according to the display timing information Tsd.

Operation and effects will now be described.

Using the construction in which the image signal RD output from the composition means 78 is input to the display means 79, which displays the image based on the image signal RD, when the composition means 78 outputs the image signal RD corresponding to a scene composed of a single object, an image of the single object is displayed. For this reason, if the bit stream corresponding to the moving picture and the like composed of plural objects, which is included in the multiplexed data Sg, is the encrypted bit stream which has been scrambled, at timing when only one object is displayed as the moving picture, there is a possibility that the image display signal supplied to the display (monitor) of the display means is copied to illegally utilize the object data of the object to-be-protected.

On the other hand, the data processing apparatus 1003a of the modification 2, the CPU 72a detects the display timing information Tsd of time when the objects to-be-protected are displayed individually, based on the scene description data of the bit stream DB output from the descrambling means 71. The display means 79 is controlled by the CPU 72a according to the display timing information Tsd, and thereby supply of the image display signal to the display (monitor) of the display means 79 is prohibited or limited, at timing when only one object to-be-protected is displayed as the moving picture. This makes it difficult to copy the image display signal corresponding to the scene composed of only the objects to-be-protected which is supplied to the display (monitor) of the display means 79, and thereby prevent the object data of the objects to-be-protected from being utilized illegally.

Moreover, in the third embodiment the data receiving-side apparatus receives the encrypted bit stream obtained by scrambling the streams of respective objects in the multiplexed bit stream including the video data corresponding to plural objects and descrambles the encrypted bit streams to reproduce the video data corresponding to the respective objects. In a case where the data receiving-side apparatus adopts the coding scheme according to MPEG4 like the third embodiment and access is made to restored data stored in the reference memory when decompressing the compressed data, scrambling and descrambling may be performed. This also provides robust protection of the objects to-be-protected.

Specifically, in the data transmission system using the coding scheme according to MPEG standard, since most of the image data is transmitted as compressed image data obtained by compressing difference image data between a current frame and a previous (past) frame, it is necessary to store restored image data of the previous frame when decompressing the compressed image data. Hence, the image data restored by the respective object decompression means is stored in corresponding reference memories.

In the data receiving-side apparatus in which the reference memory is constituted by hardware, it is difficult to copy the content in the reference memory because the apparatus needs to be reconfigured, while in the data receiving-side apparatus in which the reference memory is constituted by software, since the object data, i.e., video data corresponding to the respective objects is written into the storage on the computer, the content can be taken out by creating a special program.

Hereinafter, the data processing apparatus which has solved the above problem, will be described as modification 3 of the third embodiment.

Modification 3 of the Third Embodiment

In the data processing apparatus according to the modification 3 of the present invention, the object decompression means of the data processing apparatus 1003 of the third embodiment is adapted to scramble (encrypt) object data and write scrambled (encrypted) object data onto the reference memory, and descramble (decrypt) the scrambled(encrypted) object data read from the reference memory. The other components are identical to those of the data processing apparatus 1003 of the third embodiment.

FIG. 7(b) shows a specific structure of object decompression means 741 which performs scrambling and descrambling when accessing to the reference memory.

Turning to FIG. 7(b), the object decompression means 741 comprises a decompression unit 74a for decompressing the compressed object data output from the separation means 73, a scrambling unit 74b for scrambling the decompressed object data and outputting scrambled object data to a reference memory 751, and a descrambling unit 74c for descrambling scrambled data read from the reference memory 751 and outputting descrambled data to the decompression unit 74a.

Shown in FIG. 7(b) is the object (1) decompression means 741 of the third embodiment, although the other object decompression means 742, . . . , 726 are identical to those shown in FIG. 7(b).

In the modification 3 of the third embodiment, the object decompression means is adapted to scramble (encrypt) the object data and write the scrambled (encrypted) object data onto the reference memory, and descramble (decrypt) the scrambled (encrypted) object data read from the reference memory. Therefore, it the object data stored in the reference memory to which access is made, i.e., video data of the respective objects, is written onto the storage unit on the computer according to the special program, the content (object data) of the reference memory has been scrambled (encrypted). Consequently, this object cannot be reproduced and utilized.

The scrambling method performed when accessing to the reference memory is not limited to the scrambling method performed by using the reference memory for each object data. For instance, the image signal corresponding to the scene obtained by compositing the object data by the use of the composition means may be scrambled when stored in the memory.

As the scrambling method, various types of methods may be employed depending upon importance of copyright protection or easiness of copying the content of the reference memory in the system, such as: i) a method similar to the scrambling of the first embodiment used when the bit stream is transmitted or recorded, ii) a simplified method of i), i.e., a method which uses the scramble keys used for scrambling respective object data for the encryption process when accessing to the memory, or iii) a method which uses the scramble key Ks(1) included in the header of the scene description data.

While in the above first to third embodiments the number of objects is set to "6", the number is not limited to this. In addition, while the object data and the scene description data are packetized and multiplexed into one bit stream, data which is transmitted packet by packet on the Internet, may be handled like the packet data in one multiplexed bit stream, whereby the same effects are provided.

While in each of the above embodiments the scrambling method according to the conventional example has been discussed, any scrambling which achieves the aim of the present invention, that is, protection of a copyright for each object, such as a method using encryption stronger than that of the scrambling described above or a method using a generalized common encryption key or a public key, is applied to the encryption (scrambling) of the present invention.

While in each of the above embodiments the scrambling using the scramble key is illustrated as the encryption process, the encryption process may insert a water mark into compressed object data (content) of a specified object when outputting or compressing data. From detection of the water mark of this content when receiving or decompressing data, it is decided whether or not such content has a copyright which has been protected. When decided that the content has the copyright which has been protected, this content will not be reproduced. Thereby, like each of the above-described embodiments, the copyright is protected object by object.

The water mark is a flag and the like, composed of "1" or "0", indicating the number of the user's copyright of the content and copying the content is prohibited.

While in each of the above embodiments the coding scheme according to MPEG4 is used, any system which makes data transmission for each of plural objects composing a scene may be used regardless of the data compression according to MPEG1, MPEG, JPEG, H.261, H.263, and the like. Furthermore, the scrambling for each object of the present invention is applied to a data transmission system which is not adapted to compress the data.

While in the each of the above embodiments the data processing apparatus includes the copyright protection device which scrambles or descrambles the bit stream independently of the data compression means or the data decompression means, the data processing apparatus is not limited to this.

For instance, the object compression means in the data processing apparatus at the transmission end may be adapted to compress and scramble the object data simultaneously. To be specific, compressed object data, which cannot be restored through a normal decompression process, is generated by scrambling data of a motion vector, scrambling a part of DCT coefficients, or inverting a part of compressed object data according to a prescribed rule, and the compressed object data of the objects to-be-protected, can be restored by decompression only when they are all present. Such mechanism provides the effects of the above embodiment.

Furthermore, a program for implementing the data processing method shown in each of the embodiments is stored in a data storage medium such as a floppy disc, whereby processing is performed with ease in an independent computer system.

Figure 11:
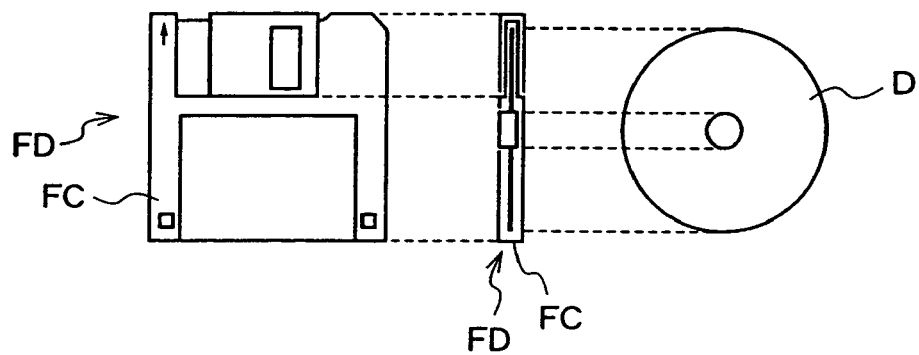
FIGS. 11(a) and 11(b) are diagrams for explaining a data storage medium which contains a program for implementing the above data processing in a computer system and FIG. 11(c) is a diagram showing the computer system.
Figure 11:
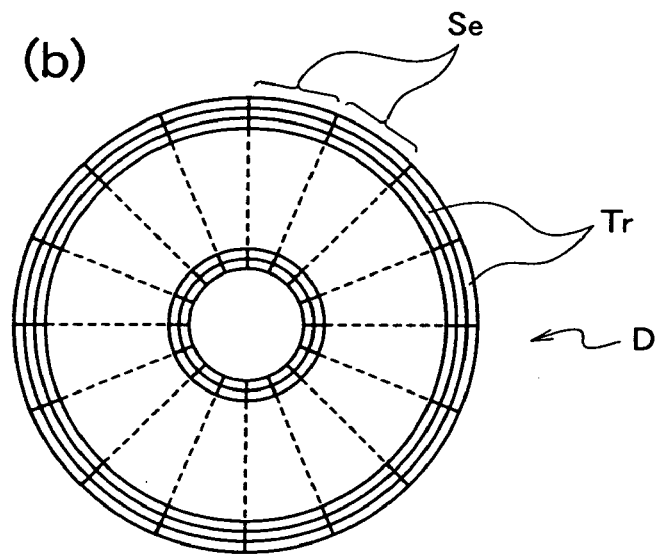
Figure 11:
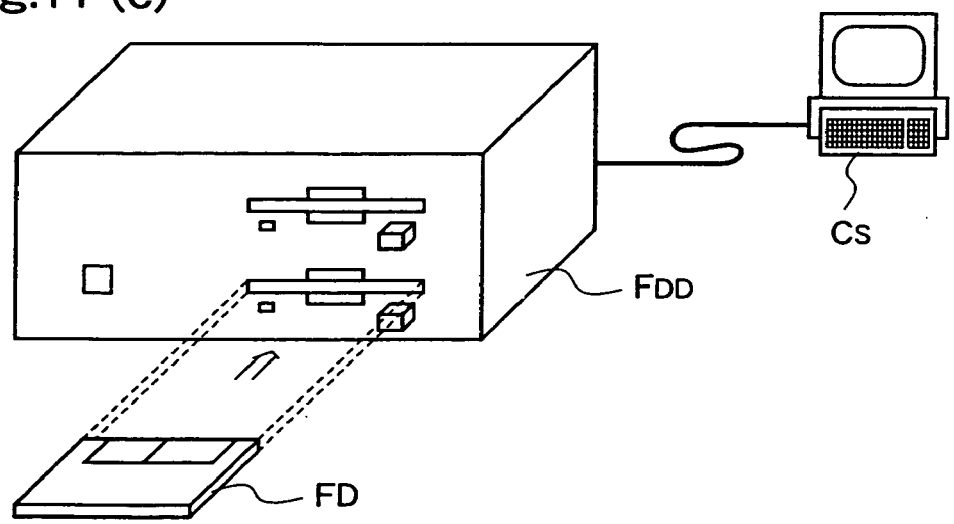

FIG. 11 is a diagram showing a case where image processing of the first to third embodiments is performed in a computer system by using a floppy disc which contains the processing program.

FIG. 11(a) shows a front appearance and a cross-section of a floppy disc FD, and a floppy disc body as the storage medium. FIG. 11(b) shows a physical format of the floppy disc body D. The floppy disc body D is stored in a case F, and in a surface of the disc body D, plural tracks Trs are formed from outer to inner radius thereof, each track being divided into 16 sectors Se in angle direction. Therefore, in the floppy disc body D which contains the program, data of the program is recorded in an allocated region of the floppy disc FD.

FIG. 11(c) shows a construction of recording and reproducing the program in/from the floppy disc FD. In case of recording the program in the floppy disc FD, the data of the program is written thereto through the floppy disc drive FDD from the computer system Cs. In another case of constructing the image decoding method in the computer system Cs by the program in the floppy disc FD, the program is read from the floppy disc FD by the use of the floppy disc drive FDD and transferred to the computer system Cs.

While description has been given of image processing in a computer system by the use of the floppy disc as the data storage medium, this image processing can be also performed by using an optical disc. Besides, the storage medium is not limited to this, and an IC card, a ROM cassette, and so forth, may be used so long as they can record a program therein.

What is claimed is:

1. A data processing method for storing or transmitting a plurality of object data and scene description data, wherein: the plurality of object data respectively correspond to a plurality of objects which compose a scene; the plurality of object data includes object data as video data or audio data; and the scene description data describes how the plurality of objects compose the scene, said method comprising:
   encrypting at least object data corresponding to specified objects which are predetermined among the plurality of objects based on control information corresponding to the object to be encrypted; and
   outputting respective object data and the scene description data to a storage medium or a transmission medium.

2. The data processing method of claim 1, wherein said outputting includes storing the control information, the control information being required for encryption, in the scene description data and outputting the control information to the storage medium or the transmission medium.

3. The data processing method of claim 1, wherein said encrypting includes using plural different control information for the respective specified objects as the control information, the control information being required for encrypting the respective object data when encrypting the object data of the specified objects.

4. The data processing method of claim 1, wherein said encrypting includes changing a type of the control information, the control information being required for encryption, with elapse of time after encryption of the object data starts.

5. A data processing method for storing or transmitting a plurality of object data and scene description data, wherein: the plurality of object data respectively correspond to a plurality of objects which compose a scene; the plurality of object data includes object data as video data or audio data; and the scene description data describes how the plurality of objects compose the scene, said method comprising:
   encrypting at least object data corresponding to specified objects which are predetermined among the plurality of objects; and
   outputting respective object data and the scene description data to a storage medium or a transmission medium, wherein
   said outputting includes storing encryption identifiers, each indicating whether or not object data of a corresponding object included in the plurality of objects has been encrypted, in the scene description data and outputting the encryption identifiers to the storage medium or the transmission medium.

6. A data processing method for storing or transmitting a plurality of object data and scene description data, wherein: the plurality of object data respectively correspond to a plurality of objects which compose a scene; the plurality of object data includes object data as video data or audio data; and the scene description data describes how the plurality of objects compose the scene, said method comprising:
   encrypting at least object data corresponding to specified objects which are predetermined among the plurality of objects; and
   outputting respective object data and the scene description data to a storage medium or a transmission medium, wherein
   said encrypting includes encrypting object data of the specified objects which is predetermined without encrypting the scene description data.

7. A data processing method for storing or transmitting a plurality of object data and scene description data, wherein: the plurality of object data respectively correspond to a plurality of objects which compose a scene; the plurality of object data includes object data as video data or audio data; and the scene description data describes how the plurality of objects compose the scene, said method comprising:
   compressing object data corresponding to each of the plurality of objects which compose the scene and outputting compressed object data;
   sequentially encrypting at least compressed object data corresponding to specified objects which are predetermined among the plurality of objects, according to control information for encryption of respective object data corresponding to the specified objects; and
   outputting respective compressed object data and the scene description data to a storage medium or a transmission medium, wherein
   said encrypting includes encrypting control information for a target object corresponding to object data to be encrypted according to control information for an encrypted object corresponding to previously encrypted object data, and adding encrypted control information to the previously encrypted object data.

8. A data processing method for storing or transmitting a plurality of object data and scene description data, wherein: the plurality of object data respectively correspond to a plurality of objects which compose a scene; the plurality of object data includes object data as video data or audio data; and the scene description data describes how the plurality of objects compose the scene, said method comprising:
   compressing object data corresponding to each of the plurality of objects which compose the scene, and outputting compressed object data;
   sequentially encrypting at least compressed object data corresponding to specified objects which are predetermined among the plurality of objects according to first control information for encryption; and
   outputting respective compressed object data and the scene description data to a storage medium or a transmission medium, wherein
   said encrypting includes encrypting the first control information according to second control information for encryption, dividing encrypted first control information into a plurality of information parts respectively corresponding to the specified objects, and adding the plurality of information parts to the object data of the specified objects, respectively.

9. A data processing apparatus for storing or transmitting a plurality of object data and scene description data, wherein: the plurality of object data respectively correspond to a plurality of objects which compose a scene; the plurality of object data includes object data as video data or audio data; and the scene description data describes how the plurality of objects compose the scene, said apparatus comprising:
   a plurality of data compressors respectively provided for the plurality of objects, operable to compress the plurality of object data, respectively, and output respective compressed object data;

a multiplexor operable to multiplex the scene description data and the respective compressed object data as individual streams and output a multiplexed bit stream; and an encryptor operable to encrypt individual streams in the multiplexed bit stream which correspond to specified objects which are predetermined among the plurality of objects based on control information corresponding to the object to be encrypted, to produce an encrypted bit stream, wherein the encrypted bit stream is output to a data storage medium or a data transmission medium.

10. A data storage medium which contains a data processing program for making a computer perform data processing for a scene selection data and a plurality of object data, wherein: the plurality of object data respectively correspond to a plurality of objects which compose a scene; the plurality of object data includes object data as video data or audio data; and the scene description data describes how the plurality of objects compose the scene, said data processing program comprising:

an encryption section operable to instruct the computer to encrypt at least object data corresponding to specified objects which are predetermined among the plurality of objects based on control information corresponding to the object to be encrypted; and a data output section operable to instruct the computer to output respective object data and the scene description data to a storage medium or a transmission medium.

11. A data processing method for use with scene description data and a plurality of object data, wherein: the plurality of object data respectively correspond to a plurality of objects which compose a scene; the plurality of object data includes object data as video data or audio data; and the scene description data describes how the plurality of objects compose the scene, said method comprising:

reading an encrypted bit stream from a storage medium or receiving the encrypted bit stream through a transmission medium, and performing reproduction of the encrypted bit stream, wherein the encrypted bit stream is previously generated by compressing the plurality of object data to produce a plurality of compressed object data, and encrypting, from among the scene description data and the plurality of compressed object data, at least predetermined compressed object data corresponding to specified objects, and the predetermined compressed object data is predetermined among the plurality of compressed object data;

deciding whether or not compressed and encrypted object data corresponding to the specified objects is reproducible; and performing reproduction of all object data when said deciding indicates that the compressed and encrypted object data is reproducible, said reproduction including decryption of the compressed and encrypted object data corresponding to the specified objects, and decompression and display of the object data.

12. The data processing method of claim 11, wherein when said deciding indicates that the compressed and encrypted object data is reproducible, the compressed and encrypted object data corresponding to all the specified objects can be read from the storage medium or can be received through the transmission medium.

13. The data processing method of claim 11, wherein when said deciding indicates that the compressed and encrypted object data is reproducible, the scene description data has been read from the storage medium or received through the transmission medium, and the compressed and encrypted object data corresponding to all the specified objects can be read from the storage medium or can be received through the transmission medium.

14. The data processing method of claim 11, wherein when said deciding indicates that the compressed and encrypted object data is reproducible, the scene description data has been read from the storage medium or received through the transmission medium and all object data including the compressed and encrypted object data corresponding to the specified objects can be read from the storage medium or can be received through the transmission medium.

15. The data processing method of claim 11, wherein when said deciding indicates that the compressed and encrypted object data is reproducible, the scene description data and object data corresponding to all objects which compose the scene have been read from the storage medium or received through the transmission medium.

16. A data processing method for use with scene description data and a plurality of object data, wherein: the plurality of object data respectively correspond to a plurality of objects which compose a scene; the plurality of object data includes object data as video data or audio data; and the scene description data describes how the plurality of objects compose the scene, said method comprising:

reading an encrypted bit stream from a storage medium or receiving the encrypted bit stream through a transmission medium, and performing reproduction of the encrypted bit stream, wherein the encrypted bit stream is previously generated by encrypting, from among the scene description data and the plurality of object data, at least predetermined object data corresponding to specified objects, and the predetermined object data is predetermined among the plurality of object data;

deciding whether the scene description data has been encrypted as encrypted scene description data in the encrypted bit stream or is unencrypted scene description data, and deciding whether each of the plurality of object data have been encrypted as encrypted object data in the encryption bit stream or are unencrypted object data;

if the scene description data is decided to have been encrypted, decrypting the encrypted scene description data;

decrypting the encrypted object data to produce respective decrypted object data; and displaying the scene based on the scene description data, the decrypted object data, and the unencrypted object data.

17. A data processing apparatus for use with scene description data and a plurality of object data, wherein: the plurality of object data respectively correspond to a plurality of objects which compose a scene; the plurality of object data includes object data as video data or audio data; and the scene description data describes how the plurality of objects compose the scene, and for use with an encrypted bit stream read from a storage medium or received through a transmission medium, wherein the encrypted bit stream is previously generated by encrypting, from among the scene description data and the plurality of object data, at least predetermined object data corresponding to specified objects, and the predetermined object data is predetermined among the plurality of object data, said apparatus comprising:

a decryption device operable to decrypt encrypted scene description data and/or encrypted object data included in the encrypted bit stream according to a first control signal, to produce decrypted data;
a display device operable to display the scene based on the decrypted data according to a second control signal; and
a controller operable to:
decide whether the scene description data has been encrypted as encrypted scene description data in the encrypted bit stream or is unencrypted scene description data, and decide whether each of the plurality of object data have been encrypted as encrypted object data in the encryption bit stream or are unencrypted object data;
control said decrypting device with said first control signal to decrypt: the encrypted scene description data if said controller decides that the scene description data has been encrypted; and the encrypted object data to produce respective decrypted object data; and
control said display device with said second control signal to display the scene based on the scene description data, the decrypted object data, and the unencrypted object data.

18. A data processing method for use with scene description data and a plurality of object data, wherein: the plurality of object data respectively correspond to a plurality of objects which compose a scene; the plurality of object data includes object data as video data or audio data; and the scene description data describes how the plurality of objects compose the scene, said method comprising:
reading an encrypted bit stream from a storage medium or receiving the encrypted bit stream through a transmission medium, and performing reproduction of the encrypted bit stream, wherein the encrypted bit stream is previously generated by encrypting, from among the scene description data and the plurality of object data, at least predetermined object data corresponding to specified objects, and the predetermined object data is predetermined among the plurality of object data;
deciding whether or not encrypted object data corresponding to the specified objects is reproducible; and
performing reproduction of all object data when said deciding indicates that the encrypted object data is reproducible, said reproduction including decryption of the encrypted object data corresponding to the specified objects and display of the object data.

19. A data processing method for use with scene description data and a plurality of object data, wherein: the plurality of object data respectively correspond to a plurality of objects which compose a scene; the plurality of object data includes object data as video data or audio data; and the scene description data describes how the plurality of objects compose the scene, said method comprising:
reading an encrypted bit stream from a storage medium or receiving the encrypted bit stream through a transmission medium, and performing reproduction of the encrypted bit stream, wherein the encrypted bit stream is previously generated by compressing the plurality of object data to produce a plurality of compressed object data, and encrypting, from among the scene description data and the plurality of compressed object data, at least predetermined compressed object data corresponding to specified objects, and the predetermined compressed object data is predetermined among the plurality of compressed object data;
judging whether the scene description data is encrypted or not encrypted, and judging whether each object data is encrypted or not encrypted;
decrypting the encrypted bit stream to produce compressed object data corresponding to the specified objects according to a result of said judging; and
decompressing the compressed object data corresponding to all objects which compose the scene, to produce restored object data, wherein said decompressing includes writing the restored object data corresponding to all objects onto reference memories and reading from the reference memories in such a way that the restored object data is subjected to secondary encryption before it is written onto the reference memories and the restored object data is subjected to decryption for decrypting the secondary encryption after it is read from the reference memories.

20. A data processing method for use with scene description data and a plurality of object data, wherein: the plurality of object data respectively correspond to a plurality of objects which compose a scene; the plurality of object data includes object data as video data or audio data; and the scene description data describes how the plurality of objects compose the scene, said method comprising:
reading an encrypted bit stream from a storage medium or receiving the encrypted bit stream through a transmission medium, and performing reproduction of the encrypted bit stream, wherein the encrypted bit stream is previously generated by compressing the plurality of object data to produce a plurality of compressed object data, and encrypting, from among the scene description data and the plurality of compressed object data, at least predetermined compressed object data corresponding to specified objects, and the predetermined compressed object data is predetermined among the plurality of compressed object data;
judging whether the scene description data is encrypted or not encrypted, and judging whether each object data is encrypted or not encrypted;
decrypting the encrypted bit stream to produce compressed object data corresponding to the specified objects according to a result of said judging; and
decompressing the compressed object data corresponding to all objects which compose the scene, to produce restored object data, wherein said decompressing includes writing the restored object data of the respective objects onto corresponding reference memories and reading from the reference memories in such a way that each of the restored object data is written onto a corresponding reference memory after it is subjected to secondary encryption and each of the restored object data is read from the corresponding reference memory and then subjected to decryption for decrypting the secondary encryption.

21. A data processing apparatus which reads an encrypted bit stream from a storage medium or receives the encrypted bit stream through a transmission medium and performs reproduction of the encrypted bit stream, said data processing apparatus being for use with scene description data and a plurality of object data,
wherein: the plurality of object data respectively correspond to a plurality of objects which compose a scene; the plurality of object data includes object data as video data or audio data; the scene description data describes how the plurality of objects compose the scene; the encrypted bit stream is obtained by compressing the plurality of object data to produce a plurality of compressed object data, and encrypting, from among the scene description data and the plurality of compressed object data, at least predetermined compressed object data corresponding to specified objects; and the predetermined compressed object data is predetermined among the plurality of compressed object data;

said data processing apparatus comprising:
- a judging unit operable to judge whether the scene description data is encrypted or not encrypted, and operable to judge whether each object data is encrypted or not encrypted;
- a decryption unit operable to decrypt the encrypted bit stream to produce decrypted data according to a result of said judging unit;
- a plurality of data decompressors respectively provided for the plurality of objects, operable to decompress corresponding compressed object data included in the decrypted data, to produce decompressed object data; and
- a plurality of memories respectively provided for the plurality of objects, operable to store corresponding decompressed object data, wherein
- each of said plurality of data decompressors includes an encryption unit operable to subject the decompressed object data to secondary decryption before it is output to a corresponding memory, and a decryption unit operable to decrypt the secondary encryption of the decompressed object data after it is read from the corresponding memory.

22. A data processing method for use with scene description data and a plurality of object data, wherein: the plurality of object data respectively correspond to a plurality of objects which compose a scene; the plurality of object data includes object data as video data or audio data; and the scene description data describes how the plurality of objects compose the scene, said method comprising:
- reading an encrypted bit stream from a storage medium or receiving the encrypted bit stream through a transmission medium, and performing reproduction of the encrypted bit stream including display of an image, wherein the encrypted bit stream is previously generated by encrypting, from among the scene description data and the plurality of object data, at least predetermined object data corresponding to specified objects, and the predetermined object data is predetermined among the plurality of object data;
- extracting the scene description data from the encrypted bit stream; and
- limiting the display of the image such that an image based on the object data corresponding to each of the specified objects is prevented from being displayed individually, according to the scene description data.

23. A data processing method for use with scene description data and a plurality of object data, wherein: the plurality of object data respectively correspond to a plurality of objects which compose a scene; the plurality of object data includes object data as video data or audio data; and the scene description data describes how the plurality of objects compose the scene, said method comprising:
- reading an encrypted bit stream from a storage medium or receiving the encrypted bit stream through a transmission medium, and performing reproduction of the encrypted bit stream including display of an image, wherein the encrypted bit stream is previously generated by encrypting, from among the scene description data and the plurality of object data, at least predetermined object data corresponding to specified objects, and the predetermined object data is predetermined among the plurality of object data;
- deciding whether or not encrypted object data corresponding to all the specified objects has been decrypted; and
- displaying the image based on the object data corresponding to the specified objects when deciding that the encrypted object data corresponding to all the specified objects has been decrypted.

* * * * *